US012568347B2

(12) United States Patent
Yeo et al.

(10) Patent No.: US 12,568,347 B2
(45) Date of Patent: Mar. 3, 2026

(54) METHOD AND APPARATUS FOR TRANSMISSION AND RECEPTION OF GROUPCAST AND BROADCAST DATA IN WIRELESS CELLULAR COMMUNICATION SYSTEM

(71) Applicant: Samsung Electronics Co., Ltd., Suwon-si (KR)

(72) Inventors: Jeongho Yeo, Suwon-si (KR); Seho Myung, Suwon-si (KR); Youngbum Kim, Suwon-si (KR); Sungjin Park, Suwon-si (KR); Hyunseok Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/642,066

(22) Filed: Apr. 22, 2024

(65) Prior Publication Data

US 2024/0292191 A1 Aug. 29, 2024

Related U.S. Application Data

(63) Continuation of application No. 17/473,200, filed on Sep. 13, 2021, now Pat. No. 11,968,599.

(30) Foreign Application Priority Data

Sep. 18, 2020 (KR) ........................ 10-2020-0120428

(51) Int. Cl.
*H04W 4/06* (2009.01)
*H04W 72/0453* (2023.01)
(Continued)

(52) U.S. Cl.
CPC ......... *H04W 4/06* (2013.01); *H04W 72/0453* (2013.01); *H04L 12/189* (2013.01); *H04L 47/78* (2013.01); *H04L 47/828* (2013.01)

(58) Field of Classification Search
CPC ......... H04W 4/00; H04W 4/06; H04W 72/04; H04W 72/0453; H04W 72/50;
(Continued)

(56) References Cited

U.S. PATENT DOCUMENTS 11,211,953 B2 * 12/2021 Kim .................... H03M 13/635
11,765,722 B2 * 9/2023 Nimbalker ............ H04L 1/0045
(Continued)

FOREIGN PATENT DOCUMENTS

CA 3 119 323 A1 8/2020
CN 106713192 A 5/2017
(Continued)

OTHER PUBLICATIONS

Korean Office Action with English translation dated Apr. 18, 2025; Korean Appln. No. 10-2020-0120428.
(Continued)

*Primary Examiner* — Warner Wong
(74) *Attorney, Agent, or Firm* — Jefferson IP Law, LLP

(57) ABSTRACT

The disclosure relates to converging a 5th-Generation (5G) communication system for supporting higher data rates beyond a 4th-Generation (4G) system with a technology for Internet of Things (IoT), and may be applied to intelligent services based on the 5G communication technology and IoT-related technology. To do so, a method and apparatus are provided for transmitting groupcast/broadcast/multicast data and control information in the downlink and uplink. The method and apparatus include features for transmitting to a user equipment (UE), configuration information for multicast and broadcast services (MBS), encoding a first bit sequence for the MBS based on a channel coding, identifying a transport block size (TBS) for limited buffer rate matching (LBRM) based on the configuration information, performing the LBRM to the encoded first bit sequence
(Continued)

based on the identified TBS, and transmitting to the UE, a second bit sequence identified based on the LBRM.

20 Claims, 17 Drawing Sheets

(51) Int. Cl.

| | |
|---|---|
| *H04L 12/18* | (2006.01) |
| *H04L 47/70* | (2022.01) |
| *H04L 47/78* | (2022.01) |

(58) Field of Classification Search

CPC ...... H04W 72/30; H04L 12/18; H04L 12/189; H04L 47/70; H04L 47/76; H04L 47/78; H04L 47/781; H04L 47/806; H04L 47/828; H04L 49/201; H04L 5/003; H04L 5/0053; H04L 61/5069; H04L 65/611; H04L 2012/5631; H04L 2012/6456

See application file for complete search history.

(56) References Cited

U.S. PATENT DOCUMENTS

| | | | | |
|---|---|---|---|---|
| 11,771,321 | B2 | 10/2023 | Pan et al. | |
| 12,108,352 | B2 * | 10/2024 | Yeo | H04L 5/0064 |
| 12,218,751 | B2 * | 2/2025 | Yeo | H04L 5/0053 |
| 2016/0007357 | A1 | 1/2016 | Yano et al. | |
| 2018/0220433 | A1 | 8/2018 | Li et al. | |
| 2019/0394000 | A1 | 12/2019 | Kim et al. | |
| 2020/0106566 | A1 | 4/2020 | Yeo et al. | |
| 2020/0244285 | A1 | 7/2020 | Kim et al. | |
| 2020/0266928 | A1 | 8/2020 | Yeo et al. | |
| 2021/0029513 | A1 * | 1/2021 | Rico Alvarino | H04W 72/121 |
| 2021/0203446 | A1 | 7/2021 | Nimbalker et al. | |
| 2021/0211232 | A1 * | 7/2021 | Hwang | H04W 72/0446 |
| 2021/0266828 | A1 | 8/2021 | Hwang et al. | |
| 2022/0104232 | A1 | 3/2022 | Nimbalker | |
| 2022/0278768 | A1 * | 9/2022 | Yeo | H04L 1/00 |
| 2022/0295522 | A1 * | 9/2022 | Park | H04W 72/1268 |
| 2022/0417710 | A1 | 12/2022 | Rico Alvarino et al. | |
| 2023/0057836 | A1 | 2/2023 | Yeo et al. | |
| 2023/0058672 | A1 * | 2/2023 | Guo | H04W 52/0219 |
| 2023/0328744 | A1 | 10/2023 | Singh et al. | |

FOREIGN PATENT DOCUMENTS

| | | | | |
|---|---|---|---|---|
| CN | 116155452 | * | 5/2023 | H04L 1/00 |
| KR | 10-2020-0036725 | A | 4/2020 | |
| KR | 10-2021-0010268 | A | 1/2021 | |
| WO | 2020/165251 | A1 | 8/2020 | |
| WO | 2021/016588 | A1 | 1/2021 | |

OTHER PUBLICATIONS

European Communication pursuant to Article 94(3) EPC dated May 22, 2025; European Appln. No. 21 869 649.0-1206.

Ericsson; Mechanisms for group scheduling of RRC_Connected UEs in NR; 3GPP TSG-RAN WG1 Meeting #102-e Tdoc; R1-2006918; Aug. 17-28, 2020; eMeeting.

3GPP; 3rd Generation Partnership Project; Technical Specification Group Radio Access Network; NR; Multiplexing and channel coding (Release 16); 3GPP TS 38.212; V16.2.0; Jun. 2020; Valbonne France.

International Search with Written Opinion dated Dec. 16, 2021; International Appln. No. PCT/KR2021/012404.

Intel Corporation; Soft buffer management for NR; 3GPP TSG RAN WG1 Meeting 91; R1-1720098; Reno, USA; Nov. 27-Dec. 1, 2017; Nov. 18, 2017.

Extended European Search Report dated Jan. 19, 2024; European Appln. No. 21869649.0-1206/ 4201008 PCT/KR2021012404.

Chinese Office Action with English translation dated Sep. 3, 2025; Chinese Appln. No. 202180064348.5.

SAMSUNG; Downiink muiticast on PDSCH; 3GPP TSG-RAN WG2 Meeting #89; R2-150247; Feb. 9-13, 2015; Athens, Greece; Jan. 30, 2015.

European Communication pursuant to Article 94(3) EPC dated Nov. 21, 2025; European Appln. No. 21 869 649.0- 1206.

* cited by examiner

METHOD AND APPARATUS FOR TRANSMISSION AND RECEPTION OF GROUPCAST AND BROADCAST DATA IN WIRELESS CELLULAR COMMUNICATION SYSTEM

CROSS-REFERENCE TO RELATED APPLICATION(S)

This application is a continuation application of prior application Ser. No. 17/473,200, filed on Sep. 13, 2021, which has issued as U.S. Pat. No. 11,968,599 on Apr. 23, 2024 and is based on and claims priority under 35 U.S.C. § 119(a) of a Korean patent application number 10-2020-0120428, filed on Sep. 18, 2020, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for groupcast, multicast or broadcast data communication.

2. Description of Related Art

To meet the demand for wireless data traffic having increased since deployment of 4$^{th}$-Generation (4G) communication systems, efforts have been made to develop an improved 5$^{th}$-Generation (5G) or pre-5G communication system. Therefore, the 5G or pre-5G communication system is also called a 'Beyond 4G Network' or a 'Post Long-Term Evolution (LTE) System.' The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid frequency shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Low-density parity-check (LDPC) codes may be applied to effectively transmit data in the NR system. In addition, there are two methods of transmitting parity bits generated by LDPC coding, a method of transmitting all parity bits generated by LDPC coding may be referred to as full buffer rate matching (FBRM), and a method of limiting the number of transmittable parity bits may be referred to as limited buffer rate matching (LBRM).

The above information is presented as background information only, and to assist with an understanding of the disclosure. No determination has been made, and no assertion is made, as to whether any of the above might be applicable as prior art with regard to the disclosure.

SUMMARY

The base station can provide groupcast, multicast and broadcast services by transmitting the same data to multiple terminals. In this case, if a service is provided to each terminal through separate data transmission and reception, frequency and time resources may be used inefficiently.

Aspects of the disclosure are to address at least the above-mentioned problems and/or disadvantages and to provide at least the advantages described below. Accordingly, an aspect of the disclosure is to provide a method and apparatus for efficiently performing data transmission and reception in order to provide groupcast and multicast services.

Additional aspects will be set forth in part in the description which follows and, in part, will be apparent from the description, or may be learned by practice of the presented embodiments.

In accordance with an aspect of the disclosure, a data transmission method of a base station in a communication system is provided. The data transmission method of the base station includes coding data based on channel coding, determining that limited buffer rate matching (LBRM) is applied to the coded data, in case that transmission of the data is for one user equipment (UE), performing the LBRM to the coded data based on a first configuration and in case that the transmission of the data is for a plurality of UEs, performing the LBRM to the coded data based on a second configuration, and transmitting a bit sequency being determined based on the performing the LBRM.

In accordance with another aspect of the disclosure, a data reception method of a UE in a communication system is provided. The data reception method of the UE includes decoding received data, identifying that LBRM is applied to the decoded data, and in case that transmission of the data is for one UE, performing the LBRM to the decoded data based on a first configuration, and in case that the transmission of the data is for a plurality of UEs, performing the LBRM to the decoded data based on a second configuration.

In accordance with another aspect of the disclosure, a base station in a communication system is provided. The base station includes a transceiver, and at least one processor configured to code data based on channel coding, determine that LBRM is applied to the coded data, in case that transmission of the data is for one UE, perform the LBRM to the coded data based on a first configuration, and in case that the transmission of the data is for a plurality of UEs, perform the LBRM to the coded data based on a second configuration, and transmit a bit sequency being determined based on the performing the LBRM via the transceiver.

In accordance with another aspect of the disclosure, a UE in a communication system is provided. The UE includes a transceiver, and at least one processor configured to decode received data, identify that LBRM is applied to the decoded data, and in case that transmission of the data is for one UE, perform the LBRM to the decoded data based on a first configuration, and in case that the transmission of the data is for a plurality of UEs, perform the LBRM to the decoded data based on a second configuration.

In accordance with another aspect of the disclosure, a method performed by a base station in a communication system is provided. The method of the base station includes transmitting, to at least one UE, configuration information for multicast and broadcast services (MBS), encoding a first bit sequence for the MBS based on a channel coding, identifying a transport block size (TBS) for limited LBRM based on the configuration information, performing the LBRM to the encoded first bit sequence based on the identified TBS, and transmitting, to the at least one UE, a second bit sequence identified based on the LBRM.

In accordance with another aspect of the disclosure, a method performed by a UE in a communication system is provided. The method of the UE includes receiving, from a base station, configuration information for MBS, demodulating a bit sequence for the MBS received from the base station, and decoding the demodulated bit sequence based on a channel coding, wherein the bit sequence is identified based on a LBRM, wherein the LBRM is performed based on a TBS for the LBRM, and wherein the TBS is identified based on the configuration information.

In accordance with another aspect of the disclosure, a base station in a communication system is provided. The base station includes a transceiver, and at least one processor configured to transmit, to at least one UE via the transceiver, configuration information for MBS, encode a first bit sequence for the MBS based on a channel coding, identify a TBS for LBRM based on the configuration information, perform the LBRM to the encoded first bit sequence based on the identified TBS, and transmit, to the at least one UE via the transceiver, a second bit sequence identified based on the LBRM.

In accordance with another aspect of the disclosure, a terminal in a communication system is provided. The terminal includes a transceiver, and at least one processor configured to receive, from a base station via the transceiver, configuration information for MBS, demodulate a bit sequence for the MBS received from the base station, and decode the demodulated bit sequence based on a channel coding, wherein the bit sequence is identified based on a LBRM, wherein the LBRM is performed based on a TBS for the LBRM, and wherein the TBS is identified based on the configuration information.

According to the disclosure, LBRM-related parameters may be configured to effectively perform LBRM on downlink data for groupcast/multicast/broadcast, or LBRM-related parameters may be appropriately configured if no parameters are set.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 illustrates FBRM and LBRM in relation to LDPC coding according to an embodiment of the disclosure;

FIG. 8 illustrates symbols within a slot to which one synchronization signal/physical broadcast channel (SS/PBCH) block is mapped according to an embodiment of the disclosure;

The same reference numerals are used to represent the same elements throughout the drawings.

DETAILED DESCRIPTION

Figure 1:
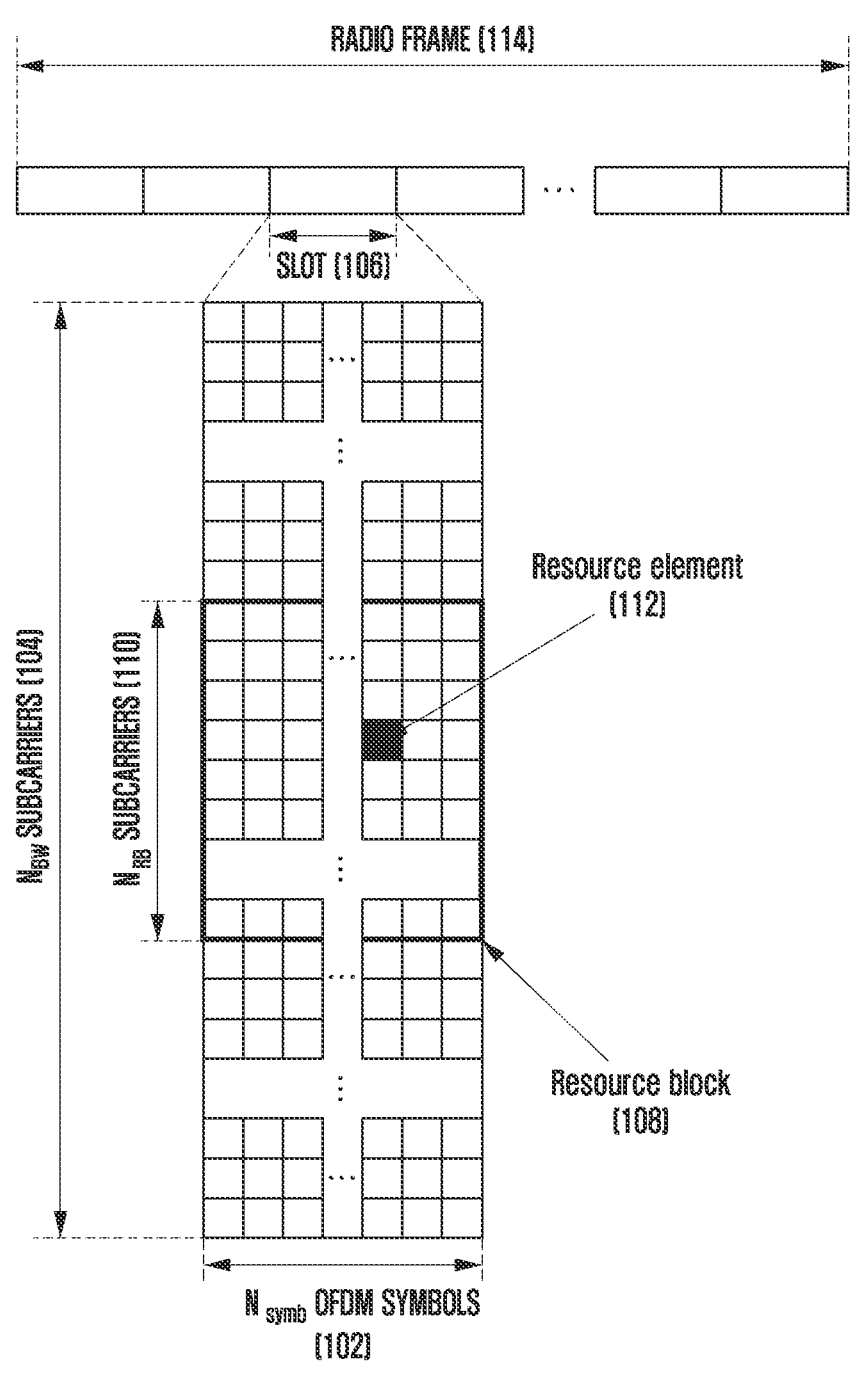
FIG. 1 illustrates a time-frequency domain structure for downlink or uplink transmission in a $5^{th}$-Generation (5G) (or new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

New Radio (NR) access technology as new fifth generation (5G) communication is being designed so that various services can be freely multiplexed in time and frequency resources, and the waveform, numerology, reference signals or the like can be dynamically or freely allocated according to the needs of corresponding services. To provide an optimal service to a user equipment (UE) in wireless communication, it is important to optimize data transmission through measurement of channel quality and interference, and hence accurate channel state measurement is essential. However, unlike fourth generation (4G) communication where the channel and interference characteristics do not change significantly depending on frequency resources, in the case of 5G channels, the channel and interference characteristics change significantly depending on the services and it is necessary to support subsets in frequency resource groups (FRG) for separate measurements. On the other hand, in the NR system, the types of supported services can be divided into categories such as enhanced mobile broadband (eMBB), massive machine type communications (mMTC), and ultra-reliable and low-latency communications (URLLC). eMBB can be seen as services aimed at high-speed transmission of high-capacity data, mMTC can be seen as services aimed at connecting many UEs with minimal UE power, and URLLC can be seen as services aimed at high reliability and low latency. Different requirements may be applied according to the types of services related to the UE.

In this way, a plurality of services may be provided to a user in a communication system. To provide such a plurality of services to a user, a method capable of providing individual services within the same time period according to their characteristics and an apparatus using the same are required.

Hereinafter, embodiments of the disclosure will be described in detail with reference to the accompanying drawings.

In the following description of embodiments, descriptions of technical details well known in the art and not directly related to the disclosure may be omitted. This is to more clearly convey the subject matter of the disclosure without obscurities by omitting unnecessary descriptions.

In the drawings, some elements may be exaggerated, omitted, or outlined only in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

It will be appreciated that blocks of a flowchart and a combination of flowcharts may be executed by computer program instructions. These computer program instructions may be loaded on a processor of a general-purpose computer, special-purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide operations for executing functions described in blocks of the flowchart.

Each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit," "module," or the like used in the embodiments may refer to a software component or a hardware component such as a field programmable gate array (FPGA) or application-specific integrated circuit (ASIC) capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card. Also, in a certain embodiment, a module or unit may include one or more processors.

In contrast to early wireless communication systems that provided voice-oriented services only, advanced broadband wireless communication systems, such as 3GPP high speed packet access (HSPA) systems, long term evolution (LTE) or evolved universal terrestrial radio access (E-UTRA) systems, LTE-advanced (LTE-A) systems, 3GPP2 high rate packet data (HRPD) systems, ultra mobile broadband (UMB) systems, and IEEE 802.16e based systems, may provide high-speed and high-quality packet data services. In addition, communication standards are being developed for 5G or NR (new radio) systems as the fifth-generation wireless communication system.

As a representative example of the broadband wireless communication system, the NR system employs orthogonal frequency division multiplexing (OFDM) in the downlink (DL) and the uplink (UL). More specifically, cyclic-prefix OFDM (CP-OFDM) is employed in the downlink, and discrete Fourier transform spreading OFDM (DFT-S-OFDM) is employed along with CP-OFDM in the uplink. The uplink refers to a radio link through which a terminal (e.g., a UE or mobile station (MS)) sends a data or control signal to a base station (BS, e.g., a Node B, evolved Node B (eNB), or next generation Node B (gNode B, gNB)), and the downlink refers to a radio link through which a base station sends a data or control signal to a UE. In such multiple access schemes, time-frequency resources used to carry user data or control information are allocated so as not to overlap each other (i.e., maintain orthogonality) to thereby identify the data or control information of a specific user.

The NR system employs hybrid automatic repeat request (HARQ) to retransmit data at the physical layer when a decoding error has occurred in the initial transmission. HARQ is a scheme that enables the receiver having failed in decoding data to transmit information (negative acknowledgement (NACK)) indicating the decoding failure to the transmitter so that the transmitter can retransmit the corresponding data at the physical layer. The receiver may combine the retransmitted data with the previously received data for which decoding has failed, increasing data reception performance. When the data is correctly decoded, the receiver may send information (acknowledgement (ACK)) indicating successful decoding to the transmitter so that the transmitter can transmit new data.

FIG. 1 illustrates a time-frequency domain structure for downlink or uplink transmission in a 5G (or NR) system according to an embodiment of the disclosure.

Referring to FIG. 1, the horizontal axis denotes the time domain and the vertical axis denotes the frequency domain. In the time domain, the minimum transmission unit is OFDM symbols, and $N_{symb}$ OFDM symbols 102 are grouped to form one slot 106. The length of a subframe is defined to be 1.0 ms, and a radio frame 114 is defined to be 10 ms. In the frequency domain, the minimum transmission unit is subcarriers, and the total system transmission bandwidth is composed of a total of $N_{BW}$ subcarriers 104. One frame may be defined to be 10 ms. One subframe may be defined to be 1 ms, and thus one frame may be composed of a total of 10 subframes. One slot may be defined to be 14 OFDM symbols (i.e., the number of symbols per slot ($N_{symb}^{slot}$=14). One subframe may be composed of one or more slots, and the number of slots per subframe may vary according to the setting value u for the subcarrier spacing. In an example of FIG. 2, cases where μ=0 and μ=1 for the subcarrier spacing setting values are illustrated. One subframe may consist of one slot when μ=0, and one subframe may consist of two slots when μ=1. That is, the number of slots per subframe ($N_{slot}^{subframe,\mu}$) may vary according to the setting value μ for the subcarrier spacing, and the number of slots per frame ($N_{slot}^{frame,\mu}$) may vary accordingly. The values of $N_{slot}^{subframe,\mu}$ and $N_{slot}^{frame,\mu}$ according to subcarrier spacing settings μ may be defined in Table 1 below.

TABLE 1

| μ | $N_{symb}^{slot}$ | $N_{slot}^{frame, \mu}$ | $N_{slot}^{subframe,}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The UE before being radio resource control (RRC) connected may be configured by the base station with an initial bandwidth part (initial BWP) for initial access through a master information block (MIB). More specifically, the UE may receive configuration information about a control region (control resource set, CORESET) and search space in which a physical downlink control channel (PDCCH) may be transmitted for receiving system information (may correspond to remaining system information (RMSI) or system information block 1 (SIB1)) required for initial access through the MIB in an initial access stage. The control region and search space configured through the MIB may each be regarded with identity (ID) 0. The base station may notify the UE of configuration information about control region #0, such as frequency allocation information, time allocation information, and numerology through the MIB. The base station may also notify the UE of configuration information including monitoring periodicity and occasions for control region #0, i.e., configuration information for search space #0 through the MIB. The UE may regard a frequency range set by control region #0 obtained from the MIB as the initial BWP for initial access. In this case, the ID of the initial BWP may be regarded as 0. The MIB may include the following information in Table 2 and Table 3 below.

TABLE 2

```
MIB
-- ASN1START
-- TAG-MIB-START
    MIB ::=              SEQUENCE {
        systemFrameNumber        BIT STRING (SIZE (6)),
        subCarrierSpacingCommon         ENUMERATED {scs15or60,
scs30or120},
        ssb-SubcarrierOffset      INTEGER (0 . . . 15),
        dmrs-TypeA-Position       ENUMERATED {pos2, p0s3},
        pdcch-ConfigSIB1          PDCCH-ConfigSIB1,
        cellBarred                ENUMERATED {barred, notBarred},
        intraFreqReselection       ENUMERATED {allowed, notAllowed},
        spare                 BIT STRING (SIZE (1))
    }
-- TAG-MIB-STOP
-- ASN1STOP
```

TABLE 3

| MIB field descriptions |
| --- |
| cellBarred |
| Value barred means that the cell is barred, as defined in TS 38.304 [20]. |
| dmrs-TypeA-Position |
| Position of (first) DM-RS for downlink (see TS 38.211 [16], clause 7.4.1.1.2) and uplink (see TS 38.211 [16], clause 6.4.1.1.3). |
| intraFreqReselection |
| Controls cell selection/reselection to intra-frequency cells when the highest ranked cell is barred, or treated as barred by the UE, as specified in TS 38.304 [20]. |
| pdcch-ConfigSIB1 |
| Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213 [13], clause 13). |
| ssb-SubcarrierOffset |
| Corresponds to kSSB (see TS 38.213 [13]), which is the frequency domain offset between SSB and the overall resource block grid in number of subcarriers. (See TS 38.211 [16], clause 7.4.3.1). The value range of this field may be extended by an additional most significant bit encoded within PBCH as specified in TS 38.213 [13]. This field may indicate that this cell does not provide SIB1 and that there is hence no CORESET#0 configured in MIB (see TS 38.213 [13], clause 13). In this case, the field pdcch-ConfigSIB1 may indicate the frequency positions where the UE may (not) find a SS/PBCH with a control resource set and search space for SIB1 (see TS 38.213 [13], clause 13). |
| subCarrierSpacingCommon |
| Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz. |
| systemFrameNumber |
| The 6 most significant bits (MSB) of the 10-bit System Frame Number (SFN). The 4 LSB of the SFN are conveyed in the PBCH transport block as part of channel coding (i.e., outside the MIB encoding), as defined in clause 7.1 in TS 38.212 [17]. |

In the method of configuring the bandwidth part, UEs before being RRC connected may receive configuration information for the initial bandwidth part through the MIB in the initial access stage. More specifically, the UE may be configured by the MIB of a physical broadcast channel (PBCH) with a control region for a downlink control channel through which downlink control information (DCI) for scheduling the SIB can be transmitted. Here, the bandwidth of the control region configured by the MIB may be regarded as the initial bandwidth part, and the UE may receive a physical downlink shared channel (PDSCH) through which the SIB is transmitted through the set initial bandwidth part. The initial bandwidth part may be used for other system information (OSI), paging, and random access in addition to the purpose of receiving the SIB. When one or more bandwidth parts are configured for the UE, the base station may instruct the UE to switch the bandwidth part by using a bandwidth part indicator field in the DCI.

A basic unit of a resource in the time-frequency domain is a resource element (RE) 112, which may be represented by an OFDM symbol index and a subcarrier index. A resource block (RB, or physical resource block (PRB)) 108 is defined as $N_{RB}$ consecutive subcarriers 110 in the frequency domain. In general, the minimum transmission unit of data is the RB unit. Generally, in the NR system, $N_{symb}$=14 and $N_{RB}$=12, and $N_{BW}$ is proportional to the bandwidth of the system transmission band. The data rate may be increased in proportion to the number of RBs scheduled for the UE.

In the case of an FDD system where the downlink and the uplink are separated by a frequency in the NR system, the downlink transmission bandwidth and the uplink transmission bandwidth may be different from each other. The channel bandwidth represents an RF bandwidth corresponding to the system transmission bandwidth. Table 4 and Table 5 show a portion of the correspondence between the system transmission bandwidth, subcarrier spacing, and channel bandwidth defined in the NR system in a frequency range lower than 6 GHz and a frequency range higher than 6 GHz, respectively. For example, in an NR system with a subcarrier spacing of 30 kHz and a channel bandwidth of 100 MHz, the transmission bandwidth may be composed of 273 RBs. In the following, N/A may indicate a bandwidth-subcarrier combination not supported by the NR system. Table 4 below shows a configuration for FR1 (frequency range 1), and Table 5 below shows a configuration for FR2 (frequency range 2).

TABLE 4

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 5

Channel bandwidth BWChannel [MHz]

| | | Subcarrier spacing | | | |
|---|---|---|---|---|---|
| | | 50 MHz | 100 MHz | 200 MHz | 400 MHz |
| Transmission bandwidth configuration $N_{RB}$ | 60 kHz | 66 | 132 | 264 | N/A |
| | 120 kHz | 32 | 66 | 132 | 264 |

In the NR system, the frequency range may be divided into FR1 and FR2 and defined as shown in Table 6 below.

TABLE 6

| Frequency range designation | Corresponding frequency range |
|---|---|
| FR1 | 450 MHz-7125 MHz |
| FR2 | 24250 MHz-52600 MHz |

In the above, the range of FR1 and FR2 may be changed and applied differently. For example, the frequency range of FR1 may be changed to a range from 450 MHz to 6000 MHz for application.

Next, a description will be given of 5G synchronization signal (SS)/PBCH block.

An SS/PBCH block may refer to a physical layer channel block including primary SS (PSS), secondary SS (SSS), and PBCH, each denoting as follows.

PSS: a reference signal for downlink time/frequency synchronization, which provides partial information of a cell ID.

SSS: a reference for downlink time/frequency synchronization, which provides the remaining information of the cell ID not provided by the PSS. It may also serve as a reference signal for PBCH demodulation.

PBCH: provides essential system information necessary for transmitting and receiving the data channel and control channel of the UE. The essential system information may include search-space-related control information indicating radio resource mapping information of the control channel, and scheduling control information for a separate data channel that transmits system information.

SS/PBCH block: SS/PBCH block is a combination of PSS, SSS, and PBCH. One or more SS/PBCH blocks may be transmitted in 5 ms, and the transmitted SS/PBCH blocks may be identified by their indexes.

The UE may detect the PSS and SSS and decode the PBCH in the initial access stage. The UE may obtain the MIB from the PBCH and may be configured with control region #0 (may correspond to the control region whose control region index is 0) accordingly. The UE may assume that the demodulation reference signal (DMRS) transmitted in control region #0 is quasi-colocated (QCLed) with the selected SS/PBCH block and perform monitoring of control region #0. The UE may receive system information through downlink control information transmitted in control region #0. The UE may obtain configuration information for the random-access channel (RACH) required for initial access from the received system information. The UE may transmit the physical RACH (PRACH) to the base station in consideration of the selected SS/PBCH index, and the base station may receive the PRACH and obtain information about the SS/PBCH block index selected by the UE. Through the above process, the base station may know that the UE has selected a specific one of the individual SS/PBCH blocks and is monitoring control region #0 associated with the selected one.

Next, a detailed description will be given of downlink control information (DCI) in the 5G system.

In the 5G system, scheduling information for uplink data (or, physical uplink shared channel (PUSCH)) or downlink data (or, physical downlink shared channel (PDSCH)) is transmitted from the base station to the UE through the DCI. The UE may monitor a fallback DCI format and a non-fallback DCI format for the PUSCH or PDSCH. The fallback DCI format may include fixed fields predefined between the base station and the UE, and the non-fallback DCI format may include configurable fields. In addition to this, there are various formats for the DCI, and whether DCI for power control or DCI for notifying a slot format indicator (SFI) may be indicated according to each format.

The DCI may be transmitted on the PDCCH being a physical downlink control channel after channel coding and modulation. A cyclic redundancy check (CRC) may be appended to the DCI message payload, and the CRC may be scrambled with a radio network temporary identifier (RNTI) corresponding to the identity of the UE. Different RNTIs may be used depending on the purpose of the DCI message, for example, UE-specific data transmission, power control command, random access response, or the like. That is, the RNTI is not explicitly transmitted but is transmitted by being included in the CRC calculation process. Upon receiving a DCI message transmitted on the PDCCH, the UE may check the CRC by using an allocated RNTI, and be aware that the DCI message is transmitted to it when the CRC check result is correct. The PDCCH is mapped to a control resource set (CORESET) configured for the UE and transmitted.

For example, the DCI that schedules the PDSCH for system information (SI) may be scrambled with by an SI-RNTI. The DCI that schedules the PDSCH for a random-access response (RAR) message may be scrambled with a RA-RNTI. The DCI that schedules the PDSCH for a paging message may be scrambled with a P-RNTI. The DCI that notifies a slot format indicator (SFI) may be scrambled with an SFI-RNTI. The DCI that notifies a transmit power control (TPC) may be scrambled with a TPC-RNTI. The DCI that schedules a UE-specific PDSCH or PUSCH may be scrambled with a cell RNTI (C-RNTI). Here, the DCI is scrambled with a radio network temporary identifier (RNTI)

value may mean that the RNTI value is added by the XOR operation (0+0=0, 1+0=1, 1+1=0) to the CRC bits appended to the DCI. In the above, the XOR operation may be a modulo-2 operation. If the number of bits of the CRC of the DCI and the number of bits of the RNTI are different, operation may be performed with LSB or MSB bits of the number with more bits. For example, when the CRC of the DCI is 24 bits and the RNTI is 16 bits, the RNTI may be scrambled with the LSB 16 bits of the CRC.

A DCI format 0_0 may be used for the fallback DCI that schedules the PUSCH, in which case the CRC may be scrambled with a C-RNTI. DCI format 0_0 with the CRC scrambled with a C-RNTI may include, for example, the following information in Table 7 below.

TABLE 7

Identifier for DCI formats - [1] bit
Frequency domain resource assignment -
$[\lceil \log_2 (N_{RB}^{UL,\ BWP} (N_{RB}^{UL,\ BWP} + 1) / 2 )\rceil]$ bits
Time domain resource assignment - X bits
Frequency hopping flag - 1 bit
Modulation and coding scheme - 5 bits
New data indicator - 1 bit
Redundancy version - 2 bits
HARQ process number - 4 bits
TPC command for scheduled PUSCH - [2] bits
UL/SUL indicator - 0 or 1 bit A DCI format 0_1 may be used for the non-fallback DCI that schedules the PUSCH, in which case the CRC may be scrambled with a C-RNTI. DCI format 0_1 with the CRC scrambled with a C-RNTI may include, for example, the following information in Table 8 below.

TABLE 8

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0 – $\lceil N_{RB}^{UL,BWP}/P \rceil$ bits
For resource allocation type 1 – $\lceil \log_2(N_{RB}^{UL,BWP}(N_{RB}^{UL,BWP} + 1)/2) \rceil$ bits
Time domain resource assignment -1, 2, 3, or 4 bits
VRB-to-PRB mapping (virtual resource block-to-physical resource block mapping) - 0 or 1 bit, only for resource allocation type 1.
  0 bit if only resource allocation type 0 is configured;
  1 bit otherwise.
  Frequency hopping flag - 0 or 1 bit, only for resource allocation type 1.
  0 bit if only resource allocation type 0 is configured;
  1 bit otherwise.
  Modulation and coding scheme - 5 bits
  New data indicator - 1 bit
  Redundancy version - 2 bits

TABLE 8-continued

HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.
TPC command for scheduled PUSCH - 2 bits $SRS$ resource indicator $- \left\lceil \log_2\left( \sum_{k=1}^{L_{max}} \binom{N_{SRS}}{k} \right) \right\rceil$ or $\lceil \log_2(N_{SRS}) \rceil$ bits $\left\lceil \log_2\left( \sum_{k=1}^{L_{max}} \binom{N_{SRS}}{k} \right) \right\rceil$ bits for non−codebook based $PUSCH$ transmission;
$\lceil \log_2(N_{SRS}) \rceil$ bits for non-codebook based PUSCH transmission;
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit A DCI format 1_0 may be used for the fallback DCI that schedules the PDSCH, in which case the CRC may be scrambled with a C-RNTI. DCI format 1_0 with the CRC scrambled with a C-RNTI may include, for example, the following information in Table 9 below.

TABLE 9

Identifier for DCI formats - [1] bit
Frequency domain resource assignment -
$[\lceil \log_2 (N_{RB}^{DL,\ BWP} (N_{RB}^{DL,\ BWP} + 1) / 2) \rceil]$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits A DCI format 1_1 may be used for the non-fallback DCI that schedules the PDSCH, in which case the CRC may be scrambled with a C-RNTI. DCI format 1_1 with the CRC scrambled with a C-RNTI may include, for example, the following information in Table 10 below.

TABLE 10

Carrier indicator - 0 or 3 bits
Identifier for DCI formats - +8 1+9 bits
Bandwidth part indicator - 0, 1 or 2 bits
Frequency domain resource assignment
For resource allocation type 0, $\lceil N_{RB}^{DL,\ BWP} / P \rceil$ bits
For resource allocation type 1, $\lceil \log_2 (N_{RB}^{DL,\ BWP} (N_{RB}^{DL,\ BWP} + 1) / 2) \rceil$ bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
ZP CSI-RS trigger - 0, 1, or 2 bits
For transport block 1:
  Modulation and coding scheme - 5 bits TABLE 10-continued

```
    New data indicator - 1 bit
    Redundancy version - 2 bits
For transport block 2:
    Modulation and coding scheme - 5 bits
    New data indicator - 1 bit
    Redundancy version - 2 bits
    HARQ process number - 4 bits
    Downlink assignment index - 0 or 2 or 4 bits
    TPC command for scheduled PUCCH - 2 bits
    PUCCH resource indicator - 3 bits
    PDSCH-to-HARQ_feedback timing indicator - 3 bits
    Antenna ports - 4, 5 or 6 bits
    Transmission configuration indication - 0 or 3 bits
    SRS request - 2 bits
    CBG transmission information - 0, 2, 4, 6, or 8 bits
    CBG flushing out information - 0 or 1 bit
    DMRS sequence initialization - 1 bit
```

Next, a description will be given of time domain resource allocation for a data channel in the 5G communication system.

The base station may configure the UE with a table regarding time domain resource allocation information for a downlink data channel (PDSCH) and an uplink data channel (PUSCH) through higher layer signaling (e.g., RRC signaling). A table including up to maxNrofDL-Allocations=16 entries can be set for the PDSCH, and a table including up to maxNrofUL-Allocations=16 entries can be set for the PUSCH. Time domain resource allocation information may include, for example, information regarding PDCCH-to- PDSCH slot timing (corresponding to the time interval in slot units between the time when the PDCCH is received and the time when the PDSCH scheduled by the received PDCCH is transmitted, denoted by K0), PDCCH-to-PUSCH slot timing (corresponding to the time interval in slot units between the time when the PDCCH is received and the time when the PUSCH scheduled by the received PDCCH is transmitted, denoted by K2), the position and length of the start symbol in which the PDSCH or PUSCH is scheduled in the slot, and PDSCH or PUSCH mapping type. For example, information as shown in Tables 11 and 12 below may be notified by the base station to the UE.

TABLE 11

```
PDSCH-TimeDomainResourceAllocationList information element
PDSCH-TimeDomainResourceAllocationList      ::=              SEQUENCE
(SIZE(1 . . . maxNrofDL-Allocations)) OF PDS CH-TimeDomainResourceAllocation
PDSCH-TimeDomainResourceAllocation ::=    SEQUENCE {
    k0                           INTEGER(0 . . . 32)                    OPTIONAL,
-- Need S
    (PDCCH-to-PDSCH timing, in slot units)
mappingType                     ENUMERATED {typeA, typeB},
    (PDSCH mapping type)
startSymbolAndLength                INTEGER (0 . . . 127)
(PDSCH start symbol and length)
}
```

TABLE 12

```
PUSCH-TimeDomainResourceAllocation information element
PUSCH-TimeDomainResourceAllocationList ::=   SEQUENCE
(SIZE(1 . . . maxNrofUL-Allocations)) OF PUSCH-TimeDomainResourceAllocation
PUS CH-TimeDomainResourceAllocation ::=    SEQUENCE {
    k2                           INTEGER(0 . . . 32)           OPTIONAL, -- Need S
    (PDCCH-to-PUSCH timing, in slot units)
    mappingType                   ENUMERATED {typeA, typeB},
    (PUSCH mapping type)
    startSymbolAndLength                INTEGER (0 . . . 127)
    (PUSCH start symbol and length)
}
```

The base station may notify the UE of one of the entries in the table for the time domain resource allocation information through L1 signaling (e.g., DCI) (for example, indicated by "time domain resource allocation" field of the DCI). The UE may obtain time domain resource allocation information for the PDSCH or PUSCH based on the DCI received from the base station. Next, a downlink control channel in the 5G communication system will be described in more detail with reference to the drawings.

Figure 2:
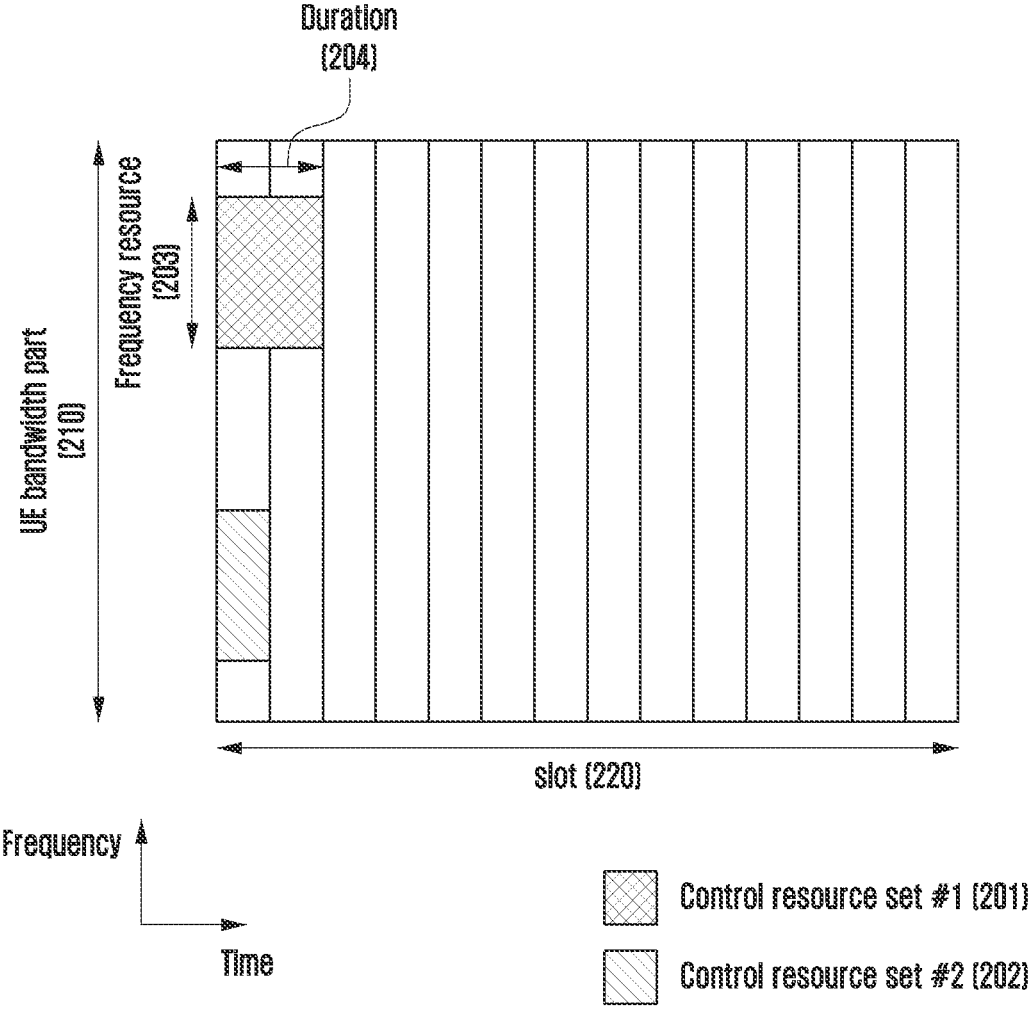
FIG. 2 illustrates a downlink control channel in a 5G wireless communication system according to an embodiment of the disclosure.

FIG. 2 illustrates a downlink control channel in a 5G wireless communication system according to an embodiment of the disclosure.

Referring to FIG. 2, FIG. 2 illustrates an example in which a UE bandwidth part 210 is set on the frequency axis, and two control regions (control region #1 201, control region #2 202) are set in one slot 220 on the time axis. The control region 201 or 202 may be set at a specific frequency resource 203 on the frequency axis within the entire UE bandwidth part 210. A control region may be set to one or a plurality of OFDM symbols on the time axis, and this may be defined as a control region length (control resource set duration, 204). In the example of FIG. 2, control region #1 201 is set to a control region length of 2 symbols, and control region #2 202 is set to a control region length of 1 symbol.

The above-described control region in 5G may be configured by the base station to the UE through higher layer signaling (e.g., system information, MIB, RRC signaling). Configuring a control region to the UE means providing information such as a control region identity, a frequency position of the control region, and a symbol length of the control region. For example, the higher layer signaling may include the information shown in Table 13 below.

For example, DCI format 1_1, which is scheduling control information (DL grant) for downlink data, may include the following control information.

Carrier indicator: indicates the carrier on which the data scheduled by the DCI is transmitted—0 or 3 bits.

Identifier for DCI formats: indicates the DCI format, and specifically, is an indicator for distinguishing whether the corresponding DCI is for the downlink or uplink—1 bits.

Bandwidth part indicator: indicate if there is a change in the bandwidth part—0, 1 or 2 bits.

Frequency domain resource assignment: resource allocation information indicating frequency domain resource allocation, and the resource represented varies depending on whether the resource allocation type is 0 or 1.

Time domain resource assignment: resource assignment information indicating time domain resource assignment, may indicate higher layer signaling or one configuration of a preset PDSCH time domain resource assignment list—1, 2, 3, or 4 bits.

VRB-to-PRB mapping: indicates a mapping relationship between a virtual resource block (VRB) and a physical resource block (PRB)—0 or 1 bit.

PRB bundling size indicator: indicates the size of physical resource block bundles to which the same precoding is assumed to be applied—0 or 1 bit.

Rate matching indicator: indicates the rate match group applied among the rate match groups applied to the PDSCH configured by higher layers—0, 1, or 2 bits.

TABLE 13

```
ControlResourceSet ::=               SEQUENCE {
    -- Corresponds to L1 parameter 'CORESET-ID'
    controlResourceSetId              ControlResourceSet:: =,
(control region identity)
    frequencyDomainResources          BIT STRING (SIZE (45)),
(frequency axis resource allocation information)
    duration                          INTEGER (1 . . . maxCoReSetDuration),
(time axis resource allocation information)
    cce-REG-MappingType               CHOICE {
(CCE-to-REG mapping type)
        interleaved                   SEQUENCE {
            reg-BundleSize                ENUMERATED {n2, n3, n6},
        (REG bundle size)
            precoderGranularity           ENUMERATED
{sameAsREG-bundle, allContiguousRBs} ,
            interleaverSize               ENUMERATED {n2, n3, n6}
            (interleaver size)
            shiftIndex
        INTEGER(0 . . . maxNrofPhysicalResourceBlocks-1)
            OPTIONAL
            (interleaver shift)
        },
        nonInterleaved                NULL
    },
    tci-StatesPDCCH                   SEQUENCE(SIZE (1 . . . maxNrofTCI-
StatesPDCCH)) OF TCI-StateId          OPTIONAL,
    (QCL configuration information)
    tci-PresentInDCI           ENUMERATED {enabled}
                               OPTIONAL, -- Need S
}
```

In Table 13, configuration information tci-StatesPDCCH (simply referred to as transmission configuration indication (TCI) state) may include information about one or plural SS/PBCH block indexes or channel state information reference signal (CSI-RS) indexes in a quasi co-location (QCL) relationship with a DMRS transmitted in the corresponding control region.

ZP CSI-RS trigger: triggers the zero power CSI-RS—0, 1, or 2 bits.

Transport block (TB) related configuration information: indicates a modulation and coding scheme (MCS), a new data indicator (NDI) and a redundancy version (RV) for one or two TBs.

Modulation and coding scheme (MCS): indicates the modulation scheme and coding rate used for data transmission. That is, it may indicate a coding rate value that can inform the TBS and channel coding information together with information indicating quadrature phase shift keying (QPSK), 16QAM, 64QAM, or 256QAM.

New data indicator: indicates whether HARQ initial transmission or retransmission.

Redundancy version: indicates a redundancy version of HARQ.

HARQ process number: indicates the HARQ process number applied to the PDSCH—4 bits.

Downlink assignment index: an index for generating a dynamic HARQ-ACK codebook when reporting HARQ-ACK for PDSCH—0 or 2 or 4 bits.

TPC command for scheduled PUCCH: power control information applied to PUCCH for HARQ-ACK report as to PDSCH—2 bits.

PUCCH resource indicator: information indicating the resource of PUCCH for HARQ-ACK report as to PDSCH—3 bits.

PDSCH-to-HARQ feedback timing indicator: configuration information on the slot in which PUCCH for HARQ-ACK report as to PDSCH is transmitted—3 bits.

Antenna ports: information indicating the antenna port of the PDSCH DMRS and the DMRS CDM group in which the PDSCH is not transmitted—4, 5 or 6 bits.

Transmission configuration indication: information indicating beam related information of PDSCH—0 or 3 bits.

SRS request: information requesting SRS transmission—2 bits.

CBG transmission information: information indicating which code block group (CBG) data is transmitted through the PDSCH when code block group-based retransmission is configured—0, 2, 4, 6, or 8 bits.

CBG flushing out information: information indicating whether the code block group previously received by the UE can be used for HARQ combining—0 or 1 bit.

DMRS sequence initialization: indicates a DMRS sequence initialization parameter—1 bit.

In the above, for data transmission over the PDSCH or PUSCH, time domain resource assignment may be transmitted by information about a slot in which PDSCH/PUSCH is transmitted, a start symbol position S in the corresponding slot, and the number of symbols L to which PDSCH/PUSCH is mapped. Here, S may be a relative position from the start of the slot, L may be the number of consecutive symbols, and S and L may be determined from a start and length indicator value (SLIV) defined as in Equation 1 below.

$$\text{if } (L-1) \le 7 \text{ then}$$

$$SLIV = 14 \cdot (L-1) + S$$

$$\text{else}$$

$$SLIV = 14 \cdot (14 - L + 1) + (14 - 1 - S)$$

$$\text{where } 0 < L \le 14 - S.$$

Equation 1

In the NR system, the UE may be configured with information about the SLIV value, the PDSCH/PUSCH mapping type, and the slot in which the PDSCH/PUSCH is transmitted in one row through RRC configuration (for example, this information may be set in the form of a table). Then, in the time domain resource assignment of the DCI, by indicating the index value in the table configured above, the base station may deliver information about the SLIV value, the PDSCH/PUSCH mapping type, and the slot in which the PDSCH/PUSCH is transmitted to the UE.

In the NR system, type A and type B are defined for the PDSCH mapping. In PDSCH mapping type A, the first symbol of DMRS symbols is located at the second or third OFDM symbol of the slot. In PDSCH mapping type B, the first symbol of DMRS symbols is located at the first OFDM symbol in the time domain resource allocated through PUSCH transmission.

Downlink data may be transmitted on the PDSCH, which is a physical channel for downlink data transmission. The PDSCH may be transmitted after the control channel transmission period, and scheduling information such as a specific mapping position in the frequency domain and a modulation scheme is determined based on the DCI transmitted through the PDCCH.

Through the MCS among the control information constituting the DCI, the base station notifies the UE of the modulation scheme applied to the PDSCH to be transmitted and the size of the data to be transmitted (transport block size (TBS)). In one embodiment, the MCS may be composed of 5 bits or more or fewer bits. The TBS corresponds to the size of data (transport block, TB) that the base station desires to transmit before channel coding for error correction is applied.

In the disclosure, the transport block (TB) may include a medium access control (MAC) header, a MAC control element, one or more MAC service data units (MAC SDUs), and padding bits. Or, the TB may indicate the unit of data being delivered from the MAC layer to the physical layer, or a MAC protocol data unit (MAC PDU).

The modulation schemes supported by the NR system are quadrature phase shift keying (QPSK), 16 quadrature amplitude modulation (16QAM), 64QAM, and 256QAM, whose modulation orders (Qm) correspond to 2, 4, 6 and 8, respectively. That is, 2 bits per symbol may be transmitted in the case of QPSK modulation, 4 bits per symbol may be transmitted in the case of 16QAM modulation, 6 bits per symbol may be transmitted in the case of 64QAM modulation, and 8 bits per symbol may be transmitted in the case of 256QAM modulation.

Figure 3:
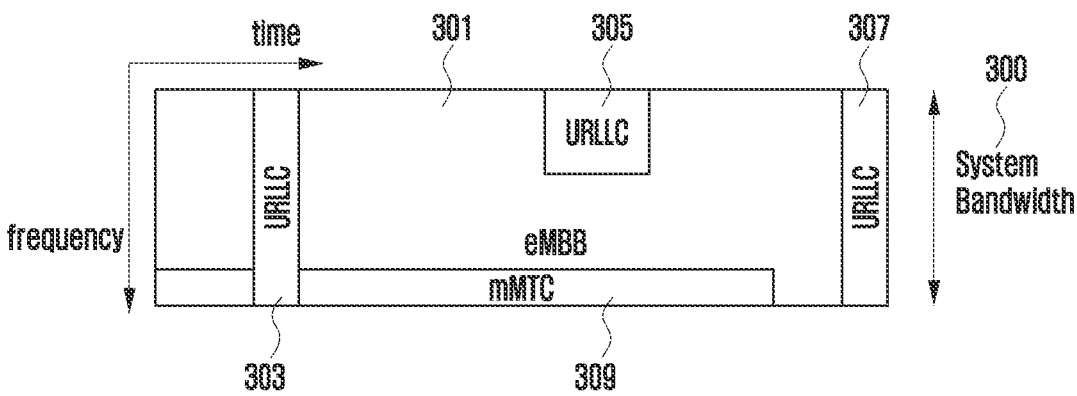
FIG. 3 illustrates an example in which enhanced mobile broadband (eMBB), ultra-reliable and low-latency communications (URLLC), and massive machine type communications (mMTC) data are allocated to frequency-time resources in a communication system according to an embodiment of the disclosure.
Figure 4:
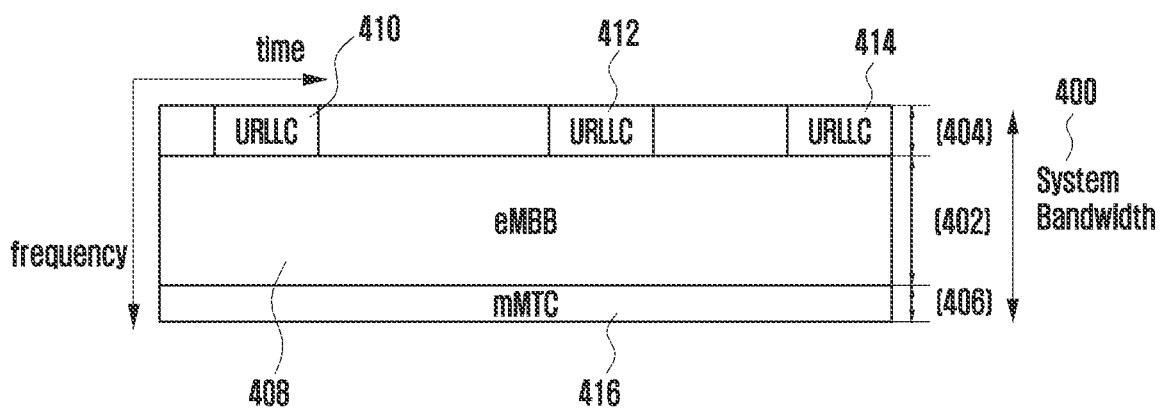
FIG. 4 illustrates an example in which eMBB, URLLC and mMTC data are allocated to frequency-time resources in a communication system according to an embodiment of the disclosure.

FIGS. 3 and 4 illustrate an example in which eMBB data, URLLC data, and mMTC data, which are services considered in a 5G or NR system, are allocated on frequency-time resources.

Methods in which frequency and time resources are allocated for information transmission in each system can be identified with reference to FIGS. 3 and 4.

FIG. 3 illustrates an example in which eMBB data, URLLC data, and mMTC data are allocated over an entire system frequency bandwidth according to an embodiment of the disclosure.

Referring to FIG. 3, pieces of data for eMBB, URLLC, and mMTC are allocated over an entire system frequency bandwidth 300. When URLLC data 303, 305, and 307 are generated and their transmission is required while eMBB 301 and mMTC 309 has been allocated in specific frequency bands and are being transmitted, the URLLC data 303, 305 and 307 may be transmitted by emptying the portions already allocated to eMBB 301 and mMTC 309 or not transmitting them. Among the above services, URLLC needs to reduce the delay time, URLLC data 303, 305 and 307 may be allocated to portions of the resources 301 to which eMBB is allocated and transmitted. Here, when URLLC is additionally allocated and transmitted through the resource already allocated to eMBB, eMBB data may be not transmitted on the overlapping frequency-time resource, and the transmission performance of eMBB data may be lowered accordingly. That is, in the above case, eMBB data transmission may fail due to URLLC allocation.

FIG. 4 illustrates an example in which eMBB, URLLC, and mMTC data are allocated by dividing a system frequency band according to an embodiment of the disclosure.

Referring to FIG. 4, an entire system frequency band 400 may be divided into sub-bands 402, 404, and 406, which may each be used for service and data transmission. Information related to the sub-band configuration may be determined in advance, and this information may be transmitted from the base station to the UE through higher-layer signaling. Alternatively, the base station or a network node may divide sub-bands at its discretion to provide services without separately transmitting sub-band configuration information to the UE. In FIG. 4, sub-band 402 is used for eMBB data transmission 408, sub-band 404 is used for URLLC data transmission 410, 412, and 414, and sub-band 406 is used for mMTC data transmission 416.

To describe the method and apparatus proposed in the embodiment, the terms "physical channel" and "signal" in the NR system may be used. However, the contents of the disclosure can be applied to wireless communication systems other than the NR system.

Hereinafter, embodiments of the disclosure will be described in detail with reference to the accompanying drawings. Descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

In the description, the term "downlink (DL)" refers to a wireless transmission path through which the base station sends a signal to the UE, and the term "uplink (UL)" refers to a wireless transmission path through which the UE sends a signal to the base station.

In the following description, embodiments of the disclosure will be described with an NR system as an example, they may be applicable to other communication systems having similar technical backgrounds or channel configurations. The subject matter of the disclosure is applicable to other communication systems without significant modifications departing from the scope of the disclosure.

In the disclosure, the terms "physical channel" and "signal" in the related art may be used interchangeably with "data" or "control signal." For example, although the PDSCH is a physical channel through which data is transmitted, the PDSCH may be referred to as data in the disclosure.

In the disclosure, higher signaling is a method for transmitting a signal from the base station to the UE by using a downlink data channel of the physical layer or from the UE to the base station by using an uplink data channel of the physical layer, and may be referred to as RRC signaling or MAC control element (MAC CE).

Figure 5:
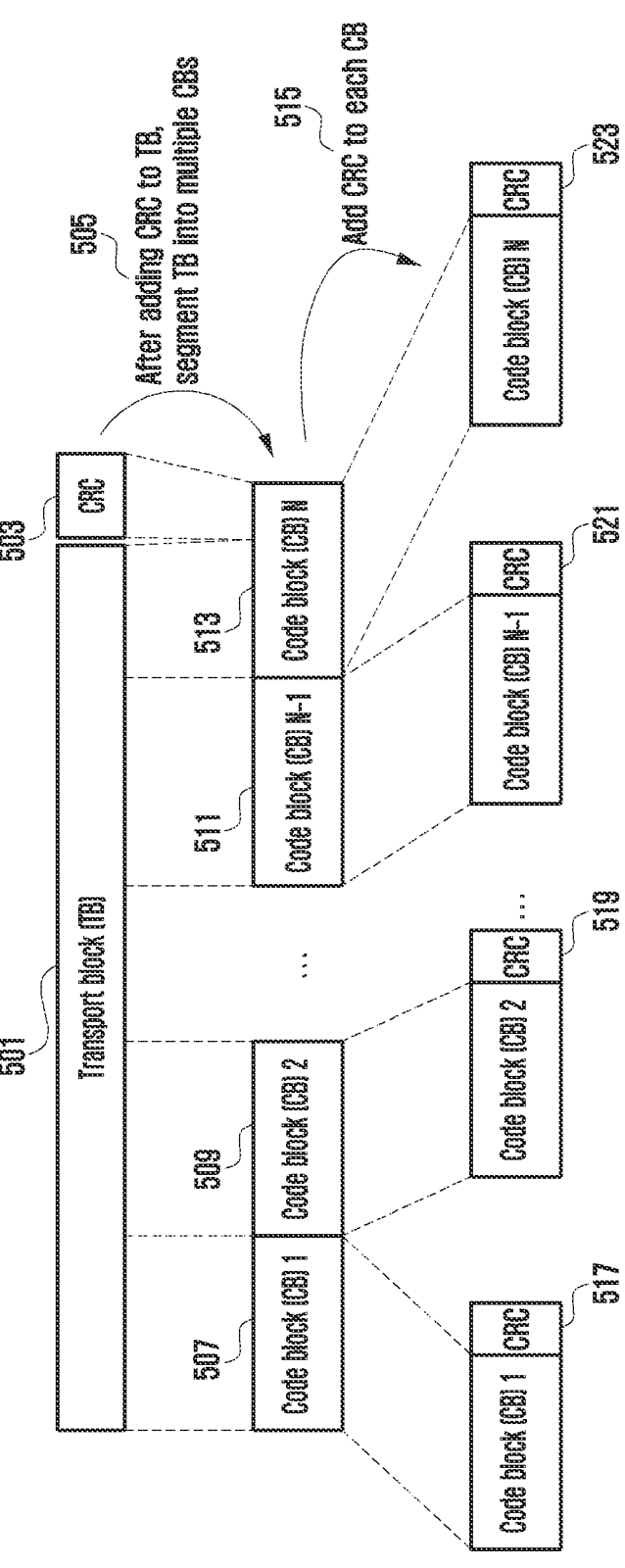
FIG. 5 illustrates an example in which one transport block is segmented into several code blocks and a cyclic redundancy check (CRC) is added according to an embodiment of the disclosure.

FIG. 5 illustrates an example of a process in which one transport block is segmented into several code blocks and a CRC is added according to an embodiment of the disclosure.

Referring to FIG. 5, a CRC 503 may be added to the last or front part of a transport block (TB) 501 to be transmitted in the uplink or downlink. The CRC 503 may have 16 bits, 25 bits, a number of bits fixed in advance, or a variable number of bits according to channel conditions, and may be used to determine whether channel coding is successful. The block obtained by adding the CRC 503 to the TB 501 may be segmented into several code blocks (CBs) 507, 509, 511, and 513 (505). Here, the maximum size of a code block may be determined in advance, in which case the last code block 513 may have a smaller size than the other code blocks 507, 509 and 511. However, this is only an illustration, and according to another example, 0, a random value, or 1 may be inserted into the last code block 513 so that the last code block 513 and the other code blocks 507, 509 and 511 have the same length.

In addition, CRCs 517, 519, 521, and 523 may be added respectively to the code blocks 507, 509, 511 and 513 (515). The CRC may have 16 bits, 24 bits, or a number of bits fixed in advance, and may be used to determine whether channel coding is successful.

The TB 501 and a cyclic generator polynomial may be used to generate the CRC 503, and the cyclic generator polynomial may be defined in various ways. For example, assuming that cyclic generator polynomial gCRC24A(D)= $D24+D23+D18+D17+D14+D11+D10+D7+D6+D5+D4+D3+D+1$ for 24-bit CRC and L=24, for TB data $a_0$, $a_1$, $a_2$, $a_3$, . . . , $a_{A-1}$, the CRC $p_0$, $p_1$, $p_2$, $p_3$, . . . , $p_{L-1}$ may be determined by dividing $a_0D^{A+23}+a_1D^{A+22}+ . . . +a_{A-1}D^{24}+p_0D^{23}+p_1D^{22}+ . . . +p_{22}D^1+p_{23}$ by gCRC24A(D) so that the remainder becomes 0. In the above example, it is assumed that the CRC length L is 24 as an illustration, but the CRC length L may be determined to have various lengths such as 12, 16, 24, 32, 40, 48, 64, and the like.

After the CRC is added to the TB through this process, TB+CRC may be segmented into N CBs 507, 509, 511 and 513. CRCs 517, 519, 521 and 523 may be added respectively to the segmented CBs 507, 509, 511 and 513 (515). The CRC added to the CB may have a different length from the CRC added to the TB, or a different cyclic generator polynomial may be used for CRC generation. Also, the CRC 503 added to the TB and the CRCs 517, 519, 521 and 523 added to the code blocks may be omitted depending on the type of channel codes applied to the code block. For example, when an LDPC code, not a turbo code, is applied to the code block, the CRCs 517, 519, 521 and 523 to be added to the individual code blocks may be omitted.

However, even when LDPC is applied, the CRCs 517, 519, 521 and 523 may be added to the code blocks. Also, even when a polar code is used, the CRC may be added or omitted.

As described in FIG. 5, the maximum length of a code block is determined according to the type of channel coding applied to the TB to be transmitted, and the TB and the CRC added thereto may be segmented into code blocks according to the maximum length of the code block.

In the related art LTE system, a CRC for the CB is added to a segmented CB, and the data bits of the CB and the CRC are encoded with a channel code to thereby determine the coded bits, and the number of rate-matched bits is determined for the coded bits as agreed in advance.

In the NR system, the TB size (TBS) for the uplink and downlink may be calculated through the steps of [TBS determination process 1] below. However, the definition of each major parameter in [TBS determination process 1] follows 3GPP standard TS 38.214.

[TBS Determination Process 1]

Step 1: calculate $N_{RE}'$, which is the number of REs allocated to PDSCH mapping in one PRB in the allocated resources.

$N_{RE}'$ may be calculated by $N_{SC}^{RB} \cdot N_{symb}^{sh} - N_{DMRS}^{PRB} - N_{oh}^{PRB}$. Here, $N_{SC}^{RB}$ is 12, and $N_{symb}^{sh}$ may indicate the number of OFDM symbols allocated to the PDSCH. $N_{DMRS}^{PRB}$ is the number of REs in one PRB occupied by DMRSs of the same CDM group. $N_{oh}^{PRB}$ is the number of REs occupied by overhead in one PRB and set by higher signaling, and may be set to one of 0, 6, 12 and 18. Then, $N_{RE}$ being the total number of REs allocated to the PDSCH may be calculated. $N_{RE}$ is calculated by $\min(156, N'_{RE}) \cdot n_{PRB}$, and $n_{PRB}$ represents the number of PRBs allocated to the UE.

Step 2: the number of temporary information bits $N_{info}$ may be calculated by $N_{RE} * R * Q_m * v$. Here, R is a code rate, Qm is a modulation order, and information on this value may be transmitted by using the MCS bit-field of the DCI and a pre-agreed table. And, v is the number of allocated layers. If $N_{info} \leq 3824$, TBS can be calculated through step 3 below. Otherwise, TBS can be calculated through step 4.

Step 3: $N_{info}'$ may be calculated by the equation $$N'_{info} = \max\left(24, 2^n * \left\lfloor \frac{N_{info}}{2^n} \right\rfloor\right) \text{ and } n = \max(3, \lfloor \log_2(N_{info}) \rfloor - 6).$$

TBS may be determined as a value closest to $N_{info}'$ among values not smaller than $N_{info}'$ in the Table 14 below.

TABLE 14

| Index | TBS |
| --- | --- |
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 11 | 128 |
| 15 | 136 |
| 16 | 144 |
| 17 | 152 |
| 18 | 160 |
| 19 | 168 |
| 90 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |

TABLE 14-continued

| Index | TBS |
| --- | --- |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: $N'_{info}$ may be calculated by the equation $$N'_{info} = \max\left(3840, 2^n \times \text{round}\left(\frac{N_{info} - 24}{2^n}\right)\right) \text{ and } n = \lfloor \log_2(N_{info} - 24) \rfloor - 5.$$

TBS can be determined through $N_{info}'$ value and [pseudo-code 1] below. In the following, C corresponds to the number of code blocks included in one TB.

```
[Start of pseudo-code 1]
if R ≤ 1/4
```

$$TBS = 8 * C * \left\lceil \frac{N'_{info} + 24}{8 * C} \right\rceil - 24, \text{ where } C = \left\lceil \frac{N'_{info} + 24}{3816} \right\rceil$$

```
else
    if N'info > 8424
```

$$TBS = 8 * C * \left\lceil \frac{N'_{info} + 24}{8 * C} \right\rceil - 24, \text{ where } C = \left\lceil \frac{N'_{info} + 24}{8424} \right\rceil$$

```
    else
```

$$TBS = 8 * \left\lceil \frac{N'_{info} + 24}{8} \right\rceil - 24$$

```
    end if
end if
[End of pseudo-code 1]
```

However, the process of determining the number of resources $N_{RE}$ allocated to the parameter PSSCH (physical sidelink shared channel) required in the TBS calculation in the sidelink of the 5G NR system may be performed in the same way as [TBS determination process 2] of Table 15 below. However, the definition of each major parameter in [TBS determination process 2] and the referenced table number follow 3GPP standard TS 38.214. Also, like [TBS determination process 1], the TBS value for the sidelink may be determined based on the resources allocated to the PSSCH, MCS, control information, and the like, in Table 15 below.

TABLE 8.1.3.2-1

| $N_{RE}^{DMRS}$ according to higher layer parameter sl-PSSCH-DMRS-TimePattern | |
|---|---|
| sl-PSSCH-DMRS-TimePattern | $N_{RE}^{DMRS}$ |
| {2} | 12 |
| {3} | 18 |
| {4} | 24 |
| {2, 3} | 15 |
| {2, 4} | 18 |
| {3, 4} | 21 |
| {2, 3, 4} | 18 |

Figure 6:
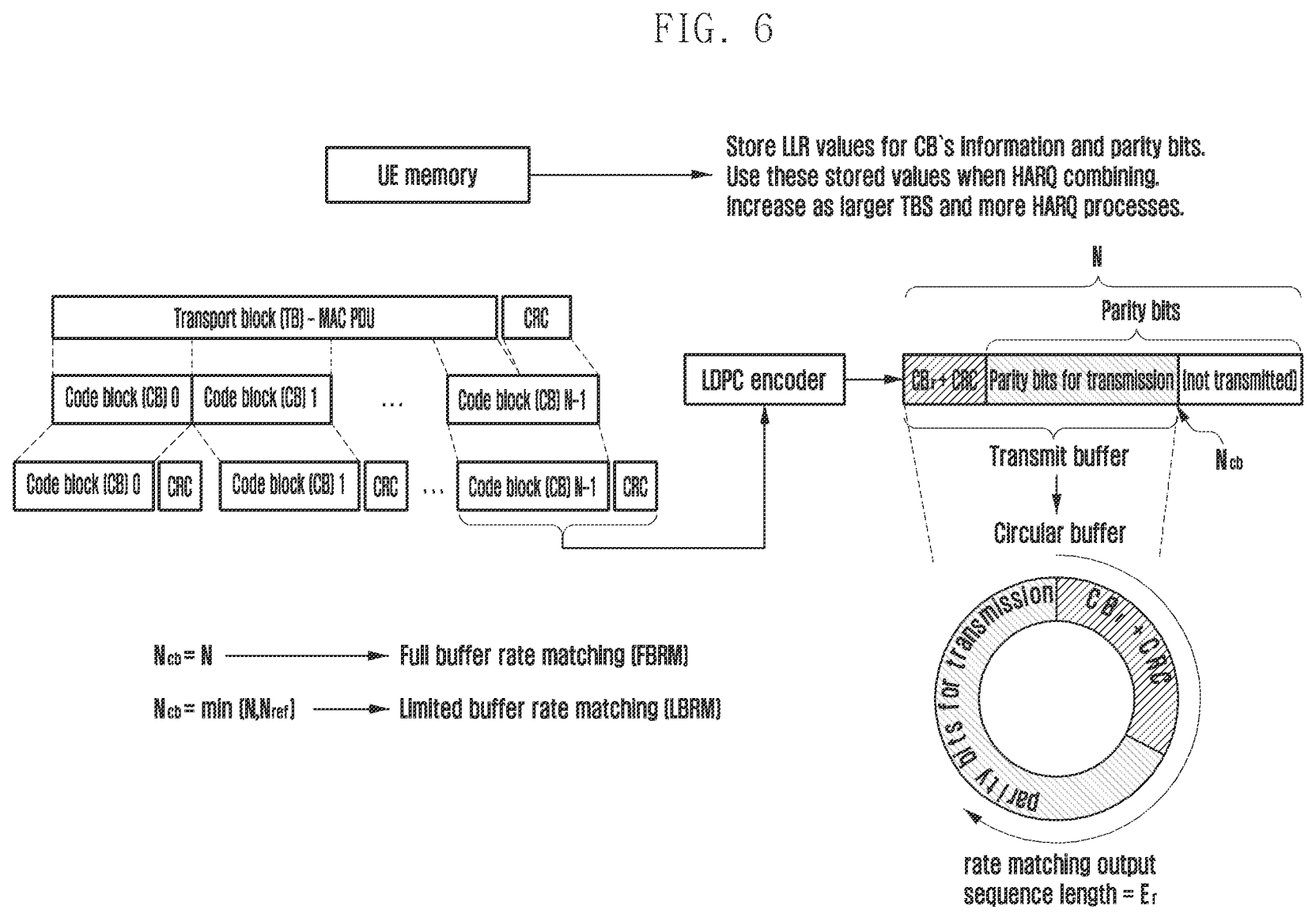

When one CB is input to the LDPC encoder in the NR system, parity bits may be added and output. Here, the amount of parity bits may vary according to an LDPC base graph. For a specific input, a method of sending all parity bits generated by LDPC coding may be called full buffer rate matching (FBRM), and a method of limiting the number of transmittable parity bits may be called limited buffer rate matching (LBRM). When a resource is allocated for data transmission, the LDPC encoder output is made in the form of a circular buffer and the created bits of the buffer are repeatedly transmitted as much as the allocated resource, where the length of the circular buffer may be called Ncb. FIG. 6 shows an example in which a TB is segmented into one or plural code blocks, channel coding is applied, and Ncb specifying parity-bit transmission is determined.

FIG. 6 illustrates FBRM and LBRM in relation to LDPC coding according to an embodiment of the disclosure.

Referring to FIG. 6, if the number of all parity bits generated by LDPC coding is N, $N_{cb}=N$ in the FBRM method. In the LBRM method, $N_{cb}$ is min(N, $N_{ref}$), $N_{ref}$ is given by $$\left\lfloor \frac{TBS_{LBRM}}{C \cdot R_{LBRM}} \right\rfloor,$$

and $R_{LBRM}$ can be determined to be 2/3. To obtain $TBS_{LBRM}$, the above-described method of obtaining TBS may be used, where the maximum number of layers and the maximum modulation order supported by the UE in the corresponding cell are assumed, the maximum modulation order $Q_m$ is assumed to be 8 when it is configured to use an MCS table that supports 256QAM for at least one BWP in the cell, and $Q_m$ is assumed to be 6 (64QAM) otherwise, the code rate is assumed to be the maximum code rate of 948/1024, $N_{RE}$ is assumed to be $156 \cdot n_{PRB}$, and $n_{PRB}$ is assumed to be $n_{PRB,LBRM}$ for calculation. $n_{PRB,LBRM}$ may be given in the Table 16 below.

TABLE 16

| Maximum number of PRBs across all configured BWPS of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

The maximum data rate supported by the UE in the NR system may be determined by Equation 2 below.
data rate (in Mbps)

$$= 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right) \right) \quad \text{Equation 2}$$

In Equation 2, J may be the number of carriers aggregated by carrier aggregation, $R_{max}=948/1024$, $v_{Layers}^{(j)}$ may be the maximum number of layers, $Q_m^{(j)}$ may be the maximum modulation order, $f^{(j)}$ may be a scaling exponent, and $\mu$ may mean the subcarrier spacing. One of 1, 0.8, 0.75 and 0.4 may be reported by the UE as the value of $f^{(j)}$, and $\mu$ may be given in the Table 17 below.

TABLE 17

| $\mu$ | $\Delta f = 2^{\mu} \cdot 15$ [kHz] | Cyclic prefix |
|---|---|---|
| 0 | 15 | Normal |
| 1 | 30 | Normal |
| 9 | 60 | Normal, Extended |
| 3 | 120 | Normal |
| 4 | 240 | Normal |

In addition, $T_S^{\mu}$ is the average OFDM symbol length and can be calculated as $$\frac{10^{-3}}{14 \cdot 2^{\mu}},$$

and $N_{PRB}^{BW(j),\mu}$ is the maximum number of RBs in BW(j). Overhead value $OH^{(j)}$ may be given as 0.14 in the downlink of FR1 (band below 6 GHZ) and as 0.18 in the uplink, and may be given as 0.08 in the downlink of FR2 (band above 6 GHZ) and as 0.10 in the uplink. Through Equation 2, the maximum data rate in the downlink in a cell having a frequency bandwidth of 100 MHz at a subcarrier spacing of 30 kHz can be calculated as the following Table 18 below.

TABLE 18

| $f^{(j)}$ | $v_{Layers}^{(j)}$ | $Q_m^{(j)}$ | Rmax | $N_{PRB}^{BW(j),\mu}$ | $T_S^{\mu}$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |

TABLE 18-continued

| $f^{(j)}$ | $v_{Layers}^{(j)}$ | $Q_m^{(j)}$ | Rmax | $N_{PRB}^{BW(j),\mu}$ | $T_S^\mu$ | $OH^{(j)}$ | data rate |
|---|---|---|---|---|---|---|---|
| 0.75 | 4 | 8 | 0.92578125 | 273 | 3.57143E-05 | 0.14 | 1752.8 |
| 0.4 | 4 | 8 | 0.92578125 | 273 | 3.57143E-05 | 0.14 | 934.8 |

The actual data rate that can be measured by the UE in actual data transmission may be a value obtained by dividing the amount of data by the data transmission time. This may be a value obtained by dividing TBS by TTI length for 1 TB transmission or a value obtained by dividing the sum of TBS by TTI length for 2 TB transmission. For example, the maximum actual data rate in the downlink in a cell having a 100 MHz frequency bandwidth at a 30 kHz subcarrier spacing may be determined as shown in Table 19 below according to the number of allocated PDSCH symbols.

TABLE 19

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30676 | 905814.0 | 14 | 901,120 | 107 | 901,344 | 0.357143 | 2,523.76 |
| 11 | 8 | 124 | 33852 | 1002865.6 | 14 | 999,424 | 119 | 999,576 | 0.392857 | 2,644.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

Through the above tables, it is possible to identify the maximum data rate supported by a UE, and to identify the actual data rate according to the allocated TBS. Here, depending on the scheduling information, there may be cases where the actual data rate is greater than the maximum data rate.

In a wireless communication system, particularly, a new radio (NR) system, the data rate that the UE can support may be mutually agreed upon between the base station and the UE. This may be calculated by using the maximum frequency band, the maximum modulation order, and the maximum number of layers supported by the UE. However, the calculated data rate may be different from the value calculated based on the transport block size (TBS) and the transmission time interval (TTI) length used for actual data transmission.

As a result, the UE may be allocated a TBS larger than the value corresponding to the data rate supported by the UE. To prevent this, there may be restrictions on the TBS that can be scheduled according to the data rate supported by the UE.

Figure 7:
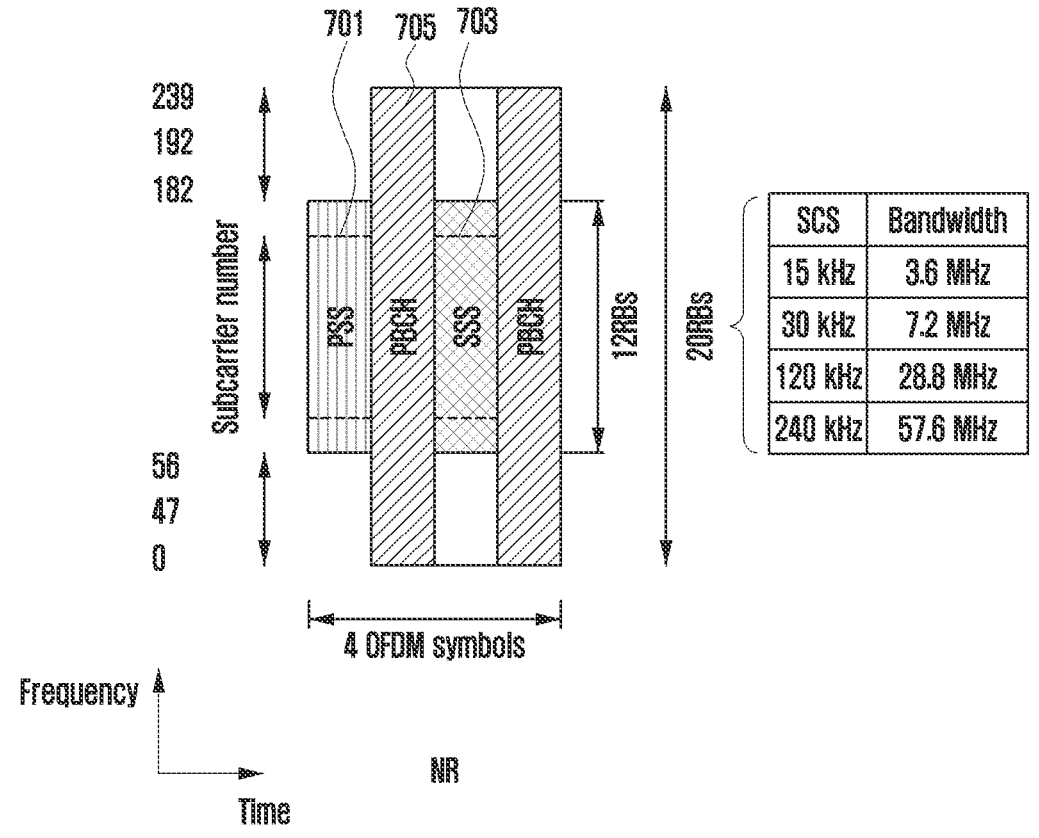
FIG. 7 illustrates synchronization signals and physical broadcast channels mapped to frequency and time domains in a 5G system according to an embodiment of the disclosure.

FIG. 7 illustrates synchronization signals and physical broadcast channels mapped to frequency and time domains in a 5G system according to an embodiment of the disclosure.

Referring to FIG. 7, a primary synchronization signal (PSS) 701, a secondary synchronization signal (SSS) 703, and a PBCH 705 are mapped over 4 OFDM symbols, the PSS and the SSS are mapped to 12 RBs, and the PBCH is mapped to 20 RBs. Changes in the frequency band of 20 RBs according to the subcarrier spacing (SCS) are shown in the table of FIG. 7. The resource region in which the PSS, SSS and PBCH are transmitted may be referred to as SS/PBCH block. Also, the SS/PBCH block may be referred to as SSB block.

Figure 8:
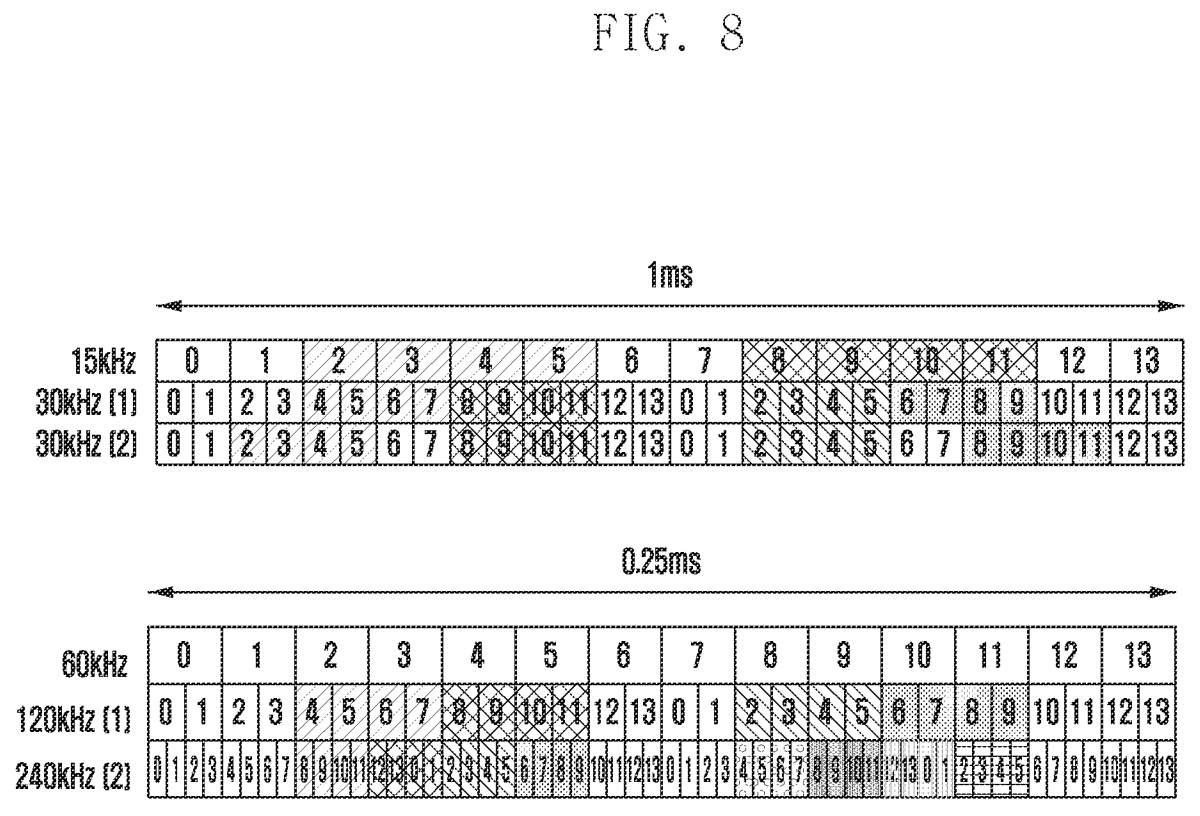

FIG. 8 illustrates symbols within a slot to which one SS/PBCH block is mapped according to an embodiment of the disclosure.

Referring to FIG. 8, the subcarrier spacing may be set to 15 kHz, 30 kHz, 120 kHz and 240 kHz, and the positions of symbols at which the SS/PBCH block (or, SSB block) may be located may be determined according to the subcarrier spacing. FIG. 8 illustrates the positions of symbols in which the SSB block can be transmitted according to the subcarrier spacing among symbols within 1 ms, and it is not always necessary to transmit the SSB block in regions shown in FIG. 8. The position at which the SSB block is transmitted may be configured in the UE through system information or dedicated signaling.

Since the UE is generally far from the base station, the signal transmitted by the UE is received by the base station after a propagation delay time. The propagation delay time is the value obtained by dividing the path through which radio waves travels from the UE to the base station by the speed of light, and it may generally be a value obtained by dividing the distance from the UE to the base station by the speed of light. In one embodiment, for a UE located 100 km away from the base station, the signal transmitted by the UE is received by the base station after about 0.34 msec. Conversely, the signal transmitted by the base station is also received by the UE after about 0.34 msec. As described above, the time when a signal transmitted by the UE arrives at the base station may vary depending on the distance between the UE and the base station. Hence, when multiple UEs at different locations transmit signals at the same time, the times when the signals arrive at the base station may all be different. To solve this problem by allowing signals transmitted from multiple UEs to arrive at the base station at the same time, the time for transmitting the uplink signal may be set differently for each UE according to its location. This is called timing advance in 5G, NR and LTE systems.

Figure 9:
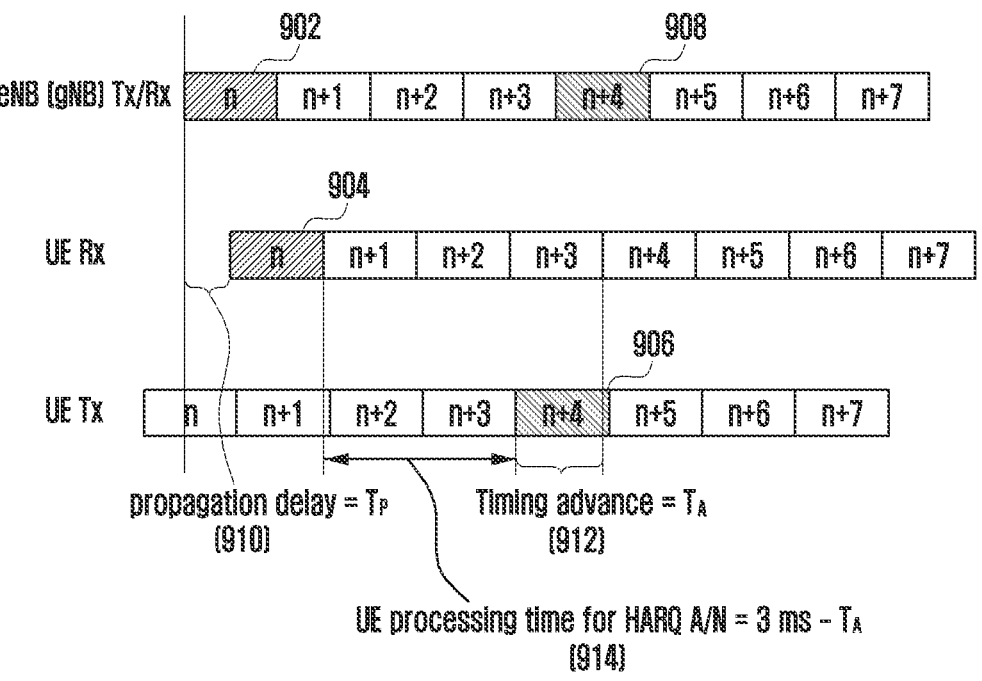
FIG. 9 illustrates a processing time of a UE due to timing advance when the UE receives a first signal and transmits a second signal in return in a 5G system according to an embodiment of the disclosure.

FIG. 9 illustrates a processing time of a UE due to timing advance when the UE receives a first signal and transmits a second signal in return in a 5G system according to an embodiment of the disclosure.

Referring to FIG. 9, a detailed description is given of the processing time of the UE according to the timing advance. When the base station transmits an uplink scheduling grant (UL grant) or a downlink control signal and data (DL grant and DL data) to the UE in slot n 902, the UE may receive the uplink scheduling grant or downlink control signal and data in slot n 904. Here, the UE may receive the signal later by a transmission delay time Tp 910 than the time the base station transmits the signal. In this embodiment, when the UE receives a first signal in slot n 904, it transmits a corresponding second signal in slot n+4 908. When the UE transmits a signal to the base station, in order for the signal to arrive at the base station at a specific time, the UE may transmit HARQ ACK/NACK for uplink data or downlink data at a timing 906 that is advanced by timing advance TA 912 than slot n+4 being a timing with respect to the signal received by the UE. Hence, in this embodiment, the time for the UE to prepare to transmit uplink data after receiving an uplink scheduling grant or transmit HARQ ACK or NACK after receiving downlink data may be a time corresponding to three slots excluding the TA 914.

For determining the above-described timing, the base station may calculate the absolute value of the TA of a specific UE. The base station may calculate the absolute value of the TA by adding or subtracting the amount of change in the TA value transmitted through higher signaling to or from the TA value that is initially delivered to the UE in the random-access stage for initial access of the UE. In the disclosure, the absolute value of the TA may be a value obtained by subtracting the start time of the $n^{th}$ TTI at which the UE receives from the start time of the $n^{th}$ TTI at which the UE transmits.

One of the important criteria for the performance of a cellular wireless communication system is packet data latency. To this end, in the LTE system, transmission and reception of signals are performed in units of subframes having a transmission time interval (TTI) of 1 ms. The LTE system operating as described above may support a UE having a transmission time interval shorter than 1 ms (short-TTI UE). In 5G or NR systems, the transmission time interval may be shorter than 1 ms. A short-TTI UE is suitable for services such as voice over LTE (VOLTE) and remote control where latency is important. In addition, the short-TTI UE may be a means to realize mission-critical Internet of Things (IoT) on a cellular basis.

In the 5G or NR system, when the base station transmits the PDSCH including downlink data, the DCI scheduling the PDSCH indicates the K1 value, which is a value corresponding to timing information at which the UE transmits HARQ-ACK information for the PDSCH. When the HARQ-ACK information is not indicated to be transmitted earlier than symbol L1 with timing advance included, the UE may transmit it to the base station. That is, the HARQ-ACK information may be transmitted from the UE to the base station at the same timing as or later than symbol L1 with timing advance included. When the HARQ-ACK information is indicated to be transmitted earlier than symbol L1 with timing advance included, the HARQ-ACK information may be not valid HARQ-ACK information in the HARQ-ACK transmission from the UE to the base station.

Symbol L1 may be the first symbol at which the cycle prefix (CP) starts after $T_{proc,1}$ from the last point in time of the PDSCH. $T_{proc,1}$ may be calculated as in Equation 3 below.

$$T_{proc,1} = ((N_1 + d_{1,1} + d_{1,2})(2048 + 144) \cdot \kappa 2^{-\mu}) \cdot T_C \qquad \text{Equation 3}$$

In Equation 3, $N_1$, $d_{1,1}$, $d_{1,2}$, $\kappa$, $\mu$ and $T_c$ may be defined as follows.
$d_{1,1}$=0 when HARQ-ACK information is transmitted on the PUCCH (uplink control channel), and $d_{1,1}$=1 when HARQ-ACK information is transmitted on the PUSCH (uplink shared channel, data channel).
When the UE is configured with a plurality of active component carriers or carriers, a maximum timing difference between the carriers may be considered in transmission of the second signal.
For PDSCH mapping type A, i.e., in the case that the first DMRS symbol is positioned at the third or fourth symbol of a slot, when position index i of the last symbol of the PDSCH is smaller than 7, $d_{1,2}$ is defined to be 7-i.
For PDSCH mapping type B, i.e., in the case that the first DMRS symbol is positioned at the first symbol of the PDSCH, $d_{1,2}$=3 when the PDSCH has a length of 4 symbols, or $d_{1,2}$=3+d when the PDSCH has a length of 2 symbols, where d is the number of overlapping symbols between the PDSCH and the PDCCH including a control signal scheduling the corresponding PDSCH.
$N_1$ is defined according to $\mu$ as in Table 20 below. $\mu$=0, 1, 2, and 3 refer to the subcarrier spacing of 15 kHz, 30 kHz, 60 kHz, and 120 kHz, respectively.

TABLE 20

| | PDSCH decoding time $N_1$ [symbols] | |
| --- | --- | --- |
| $\mu$ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

For the value of $N_1$ presented in the above table, different values may be used depending on the UE capability.
Other values may be defined as follows. $T_C$=1/($\Delta f_{max} \cdot N_f$), $\Delta f_{max}$=480·10³ Hz, $N_f$=4096, $\kappa$=$T_s/T_C$=64, $T_S$=1/($\Delta f_{ref} \cdot N_{f,ref}$), $\Delta f_{ref}$=15·10³ Hz, $N_{f,ref}$=2048
In addition, in the 5G or NR system, when the base station transmits control information including an uplink scheduling grant, it may indicate the K2 value corresponding to information on the timing at which the UE transmits uplink data or the PUSCH.
When the PUSCH is not indicated to be transmitted earlier than symbol L2 with timing advance included, the UE may transmit the PUSCH to the base station. That is, the PUSCH may be transmitted from the UE to the base station at the same timing as or later than symbol L2 with timing advance included. When the PUSCH is indicated to be transmitted earlier than symbol L2 with timing advance included, the UE may ignore the uplink scheduling grant control information from the base station.
Symbol L2 may be the first symbol at which CP of PUSCH symbols to be transmitted starts after $T_{proc,2}$ from the last point in time of the PDCCH including the scheduling grant. $T_{proc,2}$ may be calculated as in Equation 4 below.

$$T_{proc,2} = ((N_2 + d_{2,1})(2048 + 144) \cdot \kappa 2^{-\mu}) \cdot T_C \qquad \text{Equation 4}$$

In Equation 4 above, $N_2$, $d_{2,1}$, $\kappa$, $\mu$, and $T_C$ may be defined as follows.

$d_{2,1} = 0$ when the first symbol among the symbols allocated to the PUSCH includes only DMRS, and $d_{2,1} = 1$ otherwise.

When the UE is configured with a plurality of active component carriers or carriers, a maximum timing difference between the carriers may be reflected in transmission of the second signal.

$N_2$ is defined according to $\mu$ as in Table 21 below. $\mu=0$, 1, 2, and 3 refer to the subcarrier spacing of 15 kHz, 30 kHz, 60 kHz, and 120 kHz, respectively.

TABLE 21

| $\mu$ | PUSCH preparation time $N_2$ [symbols] |
|---|---|
| 0 | 10 |
| 1 | 12 |
| 2 | 23 |
| 3 | 36 |

For the value of N2 presented in the above table, different values may be used depending on the UE capability. Other values may be defined as follows.

$$T_C = 1/(\Delta f_{max} \cdot N_f), \Delta f_{max} = 480 \cdot 10^3 \text{ Hz},$$

$$N_f = 4096, \kappa = T_S/T_C = 64, T_S = 1/(\Delta f_{ref} \cdot N_{f,ref}),$$

$$\Delta f_{ref} = 15 \cdot 10^3 \text{ Hz}, N_{f,ref} = 2048$$

In the 5G or NR system, a frequency bandwidth part (BWP) may be configured in one carrier, and a particular UE may be designated to perform transmission and reception in the configured BWP. This may aim at reducing power consumption of the UE. The base station may configure a plurality of BWPs, and switch an active BWP through control information. The time usable by the UE to switch the BWP may be defined as in Table 22A below.

TABLE 22A

| Frequency range | Scenario | Type 1 delay (us) | Type 2 delay (us) |
|---|---|---|---|
| 1 | 1 | 600 | 2000 |
| | 2 | 600 | 2000 |
| | 3 | 600 | 2000 |
| | 4 | 400 | 950 |
| 2 | 1 | 600 | 2000 |
| | 2 | 600 | 2000 |
| | 3 | 600 | 2000 |
| | 4 | 400 | 950 |

In Table 22A, frequency range 1 refers to a range of frequencies lower than or equal to 6 GHZ, and frequency range 2 refers to a range of frequencies higher than or equal to 6 GHz. In the embodiment, type 1 and type 2 may be determined based on UE capabilities. In the embodiment, scenarios 1, 2, 3 and 4 are given as in Table 22B below.

TABLE 22B

| | Variable center frequency | Invariable center frequency |
|---|---|---|
| Variable frequency bandwidth | Scenario 3 | Scenario 2 |
| Invariable frequency bandwidth | Scenario 1 | Scenario 4 when subcarrier spacing changes |

Figure 10:
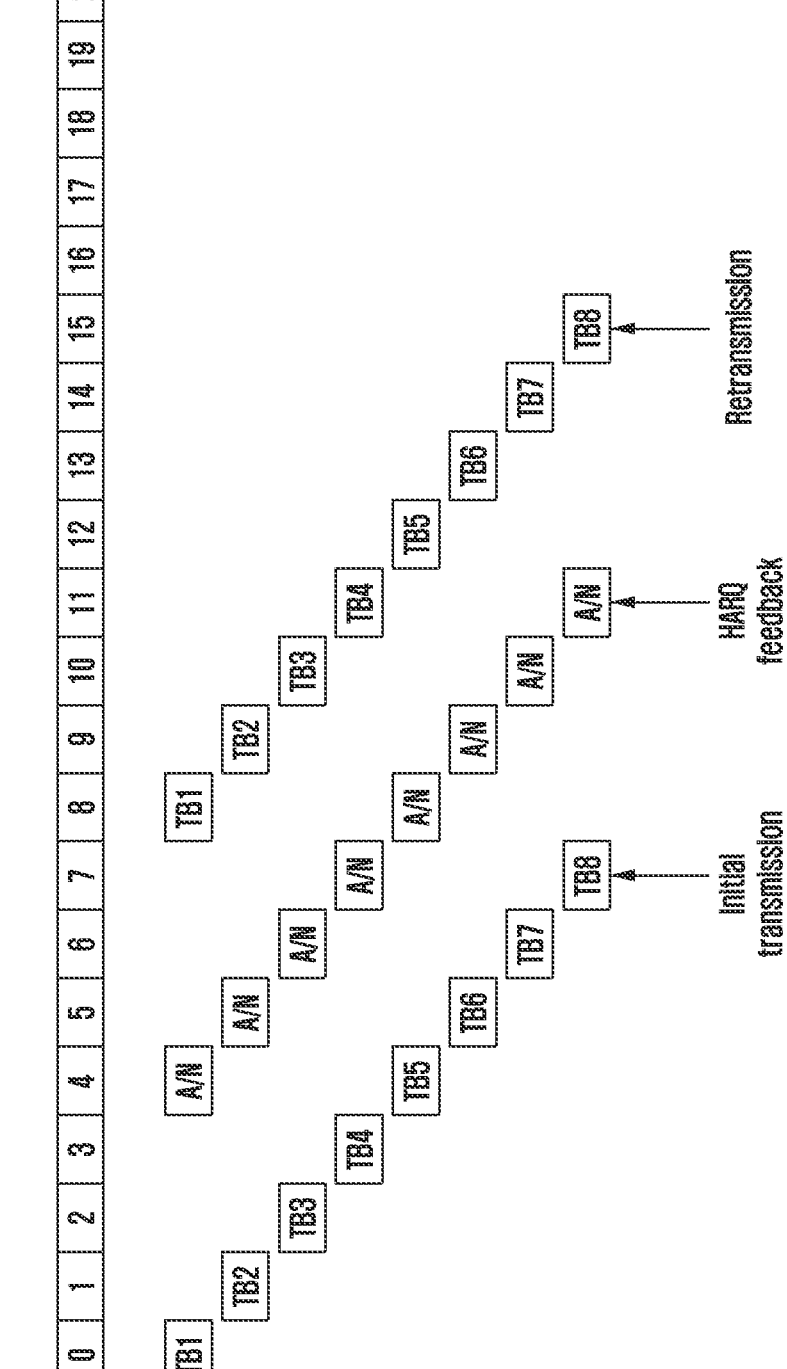
FIG. 10 illustrates an example of scheduling and transmitting data according to a slot, receiving hybrid automatic repeat request—acknowledgment (HARQ-ACK) feedback for corresponding data, and performing retransmission according to the feedback in a 5G system according to an embodiment of the disclosure.

FIG. 10 illustrates an example of scheduling and transmitting data (e.g., TBs) according to slots, receiving HARQ-ACK feedback for the data, and performing retransmission according to the feedback according to an embodiment of the disclosure.

Referring to FIG. 10, TB1 is initially transmitted in slot 0, and ACK/NACK feedback for this is transmitted in slot 4. If the initial transmission of TB1 fails and a NACK is received, retransmission for TB1 may be performed in slot 8. Here, the time point at which ACK/NACK feedback is transmitted and the time point at which retransmission is performed may be determined in advance or may be determined according to a value indicated in control information and/or higher layer signaling.

FIG. 10 shows an example in which TB1 to TB8 are scheduled and transmitted in sequence according to slots from slot 0. For example, this may indicate that HARQ process IDs 0 to 7 are assigned respectively to TB1 to TB8 for transmission. If the number of HARQ process IDs that can be used by the base station and the UE is only 4, it may be not possible to successively transmit eight different TBs.

Figure 11:
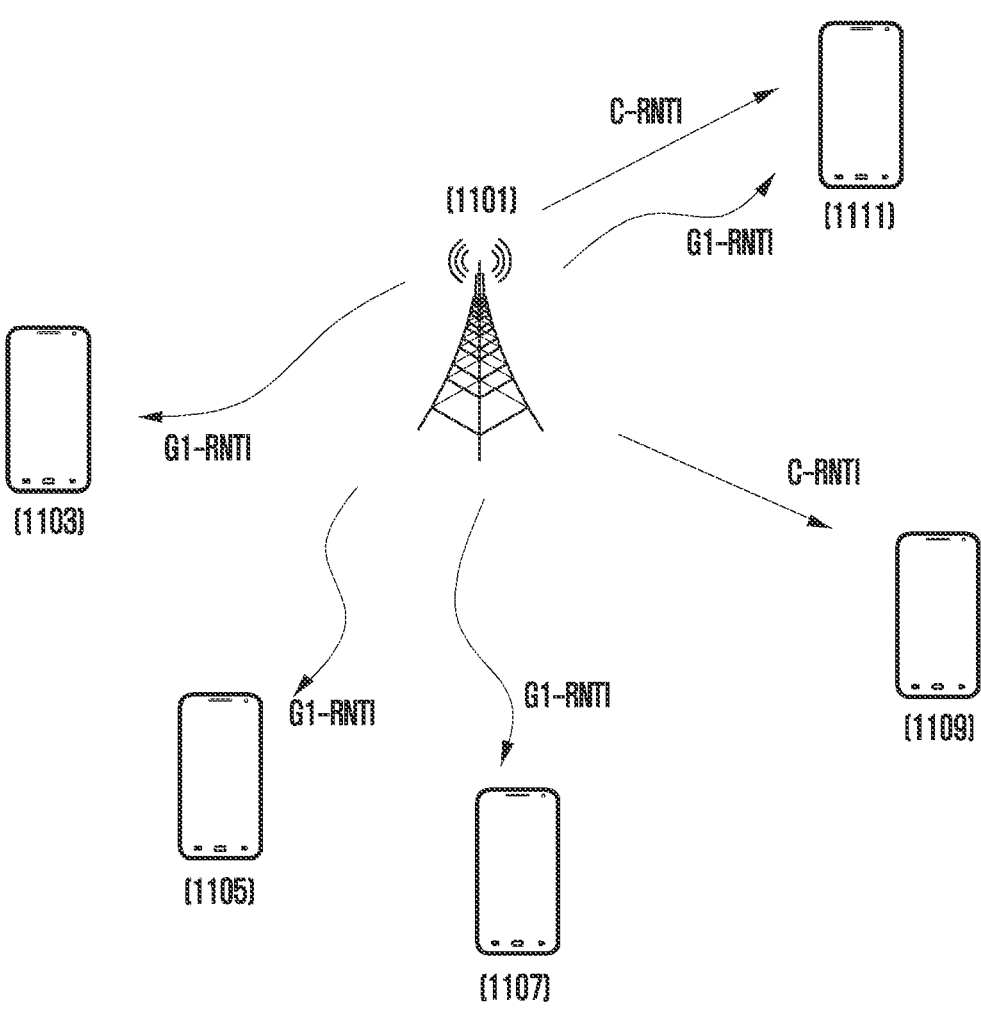
FIG. 11 illustrates an example of a groupcast in which a base station transmits same control information and data to a plurality of UEs according to an embodiment of the disclosure.

FIG. 11 illustrates an example of a groupcast in which a base station transmits same control information and data to a plurality of UEs according to an embodiment of the disclosure.

Referring to FIG. 11, a base station 1101 may notify UEs 1103, 1105, 1107, and 1111 of a G1-RNTI for receiving groupcast control information through the SIB or preconfigured information, and the UEs may receive groupcast control information by using the G1-RNTI. Here, the G1-RNTI may be transmitted by being scrambled with the CRC of groupcast downlink control information (DCI). In FIG. 11, a UE 1109 may be a UE connected to the base station 1101, and may be a UE that has received a C-RNTI from the base station 1101. In addition, the UE 1111 may be a UE connected to the base station 1101, and may be a UE that has received a C-RNTI from the base station 1101 and knows the G1-RNTI for groupcast. As described above, when the same control information and data are transmitted and one or plural UEs can receive the transmitted control information and data, the control information and data may be referred to as groupcast. In addition, when a C-RNTI or UE-specific RNTI is given to a specific UE like the UE 1109 or the UE 1111 in FIG. 11, and only the specific UE can receive control information or data by using the RNTI value, this can be referred to as unicast.

A UE may be configured to receive a control channel and data channel for groupcast from a transmitting end A, and to receive a control channel and data channel for unicast from a transmitting end B. In this embodiment, the transmitting end A and the transmitting end B may be the same transmitting end or may be different transmitting ends. In the disclosure, the transmitting end A and the transmitting end B may be a base station or may be a vehicle or a UE. Here, when the transmitting end is a base station, groupcast and unicast data transmission may be transmitted from the base station, that is, transmitted through the Uu link. When the transmitting end is a vehicle or a regular UE, groupcast and unicast transmission may be sidelink transmission. In this case, the transmitting end may be a UE called a leader node or anchor node in the group, and may be a UE that can perform groupcast transmission to other UEs in the group and can receive control information from another UE. In addition, this embodiment can be applied with a modification as in the case where the transmitting end A is a vehicle and the transmitting end B is a base station. Although this embodiment is described on the assumption that the transmitting end A and the transmitting end B are one transmitting end, it can be applied with a modification even when they are different transmitting ends.

To receive a control channel and data channel for groupcast/broadcast/multicast, the UE may be configured with an RNTI value corresponding to a unique ID (used interchangeably with group RNTI (G-RNTI), group common RNTI (GC-RNTI), group identifier, or MBS RNTI in the following description), or may receive it from the base station or another UE in the group (this can be a leader node). The UE may receive a control channel for groupcast by using the G-RNTI value, and may receive a data channel based thereon. In this embodiment, the control channel for data scheduling may be used interchangeably with the physical downlink control channel (PDCCH) or the physical sidelink control channel (PSCCH), the data channel may be used interchangeably with the physical downlink shared channel (PDSCH) or the physical sidelink shared channel (PSSCH), and the feedback channel may be used interchangeably with the physical uplink control channel (PUCCH) or the PSCCH. In addition, although control information for scheduling received by the UE is hereinafter described as DCI, it may be referred to differently.

For example, groupcast data and control information for scheduling the groupcast data may be transmitted using a G-RNTI. Here, channel coding may be applied by scrambling a G-RNTI value or a partial value thereof with the CRC of the control information (DCI). This RNTI may be different from a UE-specific RNTI for unicast data transmission, and may be configured to a plurality of UEs. This DCI may have a different format from the DCI for unicast data scheduling.

When one UE transmits data to a plurality of UEs or when a base station transmits the same data to a plurality of UEs, this may be referred to as groupcast or multicast, and they may be used interchangeably. In addition, in the disclosure, data may mean a transport block transmitted on a shared channel such as PDSCH, PUSCH, or PSSCH. In the downlink or sidelink of the 5G NR system, groupcast or multicast and broadcast services (MBS) may be supported in consideration of FBRM. However, the types of UEs receiving a groupcast or MBS service may be very diverse, and hence some UEs that do not have a sufficient internal buffer may have difficulty in soft buffer operation or may experience performance degradation. Therefore, in the case of providing some groupcast or multicast services or broadcast services (hereinafter, referred to as MBS for convenience), LBRM may be applied to stably provide services to various and many UEs.

In this case, an LBRM scheme is provided that is suitable for an MBS in the downlink or sidelink.

First, the current PDSCH LBRM scheme in 5G NR is the same as [existing rate matching configuration in consideration of PDSCH-LBRM] described in Table 23 below. However, the definition of each major parameter and the referenced table number of [existing rate matching configuration in consideration of PDSCH-LBRM] follow 3GPP standard TS 38.212.

TABLE 23

The bit sequence after encoding $d_0, d_1, \ldots, d_{N-1}$ from Clause 5.3.2 is written into a circular buffer of length $N_{cb}$ for the r-th coded block, where N is defined in Clause 5.3.2.

For the r -th code block, let $N_{cb} = N$ if $I_{LBRM} = 0$ and $N_{cb} = $ $$\min(N, N_{ref}) \text{ otherwise, where } N_{ref} = \left\lfloor \frac{TBS_{LBRM}}{C \cdot R_{LBRM}} \right\rfloor, R_{LBRM} = 2/3,$$

$TBS_{LBRM}$ is determined according to Clause 5.1.3.2 in [TS 38.214] for DL-SCH/PCH, assuming the following:

maximum number of layers for one TB for DL-SCH/PCH is given by the minimum of X and 4, where if the higher layer parameter maxMIMO-Layers of PDSCH-ServingCellConfig of the serving cell is configured, X is given by that parameter otherwise, X is given by the maximum number of layers for PDSCH supported by the UE for the serving cell if the higher layer parameter mcs-Table given by a pdsch-Config for at least one DL BWP of the serving cell is set to 'qam256,' maximum modulation order $Q_m = 8$ is assumed for DL-SCH; otherwise a maximum modulation order $Q_m = 6$ is assumed for DL-SCH;

maximum coding rate of 948/1024;

$n_{PRB} = n_{PRB,LBRM}$ is given by Table 5.4.2.1-1, where the value of $N_{PRB,LBRM}$ for DL-SCH is determined according to the initial downlink bandwidth part if there is no other downlink bandwidth part configured to the UE;

$N_{RE} = 156 \cdot n_{PRB}$;

C is the number of code blocks of the transport block determined according to Clause 5.2.2.

Table 5.4.2.1-1: Value of $n_{PRB,LBRM}$

| Maximum number of PRBs across all configured DL BWPs and UL BWPs of a carrier for DL-SCH and UL-SCH, respectively | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

According to [existing rate matching configuration in consideration of PDSCH-LBRM], to identify or determine $TBS_{LBRM}$ when LBRM is applied, the maximum number of layers for one TB is determined based on parameter maxMIMO-Layers included in PDSCH-ServingCellConfig of higher layer signaling or the maximum number of layers for the PDSCH supported by the UE in the serving cell. However, this value does not exceed 4. In addition, the modulation order is determined based on parameter mcs-Table included in pdsch-Config of higher layer signaling or a preset value (e.g., 6). The above method may be suitable for LBRM for a specific UE, but it may be not suitable for applying LBRM considering a service such as MBS to a plurality of UEs. Therefore, various embodiments of the disclosure propose an LBRM scheme suitable for a service such as MBS. In applying LBRM to data transmission supporting a service such as MBS according to various embodiments of the disclosure, at least one of the first to fifth embodiments described below may be applied to the method of configuring parameters (e.g., number of allocated layers, modulation order, number of PRBs) to be considered for identifying $TBS_{LBRM}$. According to various embodiments of the disclosure, the base station supporting services such as MBS may apply LBRM by identifying the same $TBS_{LBRM}$ when transmitting the same data to a plurality of UEs.

First Embodiment

A first embodiment of the disclosure relates to a method and apparatus for efficiently applying downlink LBRM (PDSCH-LBRM, DL-SCH LBRM, or PCH LBRM) in performing groupcast or multicast/broadcast data transmission to support a service such as MBS. For convenience, it is hereinafter referred to as PDSCH-LBRM.

First, a description is given of a method of applying LBRM through separately configured parameters when LBRM is applied to groupcast or multicast/broadcast, although being similar to the method of [existing rate matching configuration in consideration of PDSCH-LBRM] of Table 23 above. In [existing rate matching configuration in consideration of PDSCH-LBRM], as the parameters such as maxMIMO-Layers required to determine the maximum number of layers for one TB, the maximum number of layers for the PDSCH supported by the UE in the serving cell, and mcs-Table for determining the modulation order are parameters considering unicast, they may be parameters that are not suitable for groupcast or multicast/broadcast. Therefore, if an instruction for performing LBRM is received while groupcast or multicast/broadcast is supported, $TBS_{LBRM}$ may be identified or determined based on at least one parameter different from those parameters used in [existing rate matching configuration in consideration of PDSCH-LBRM] (i.e., parameters configured in consideration of unicast).

Figure 12:
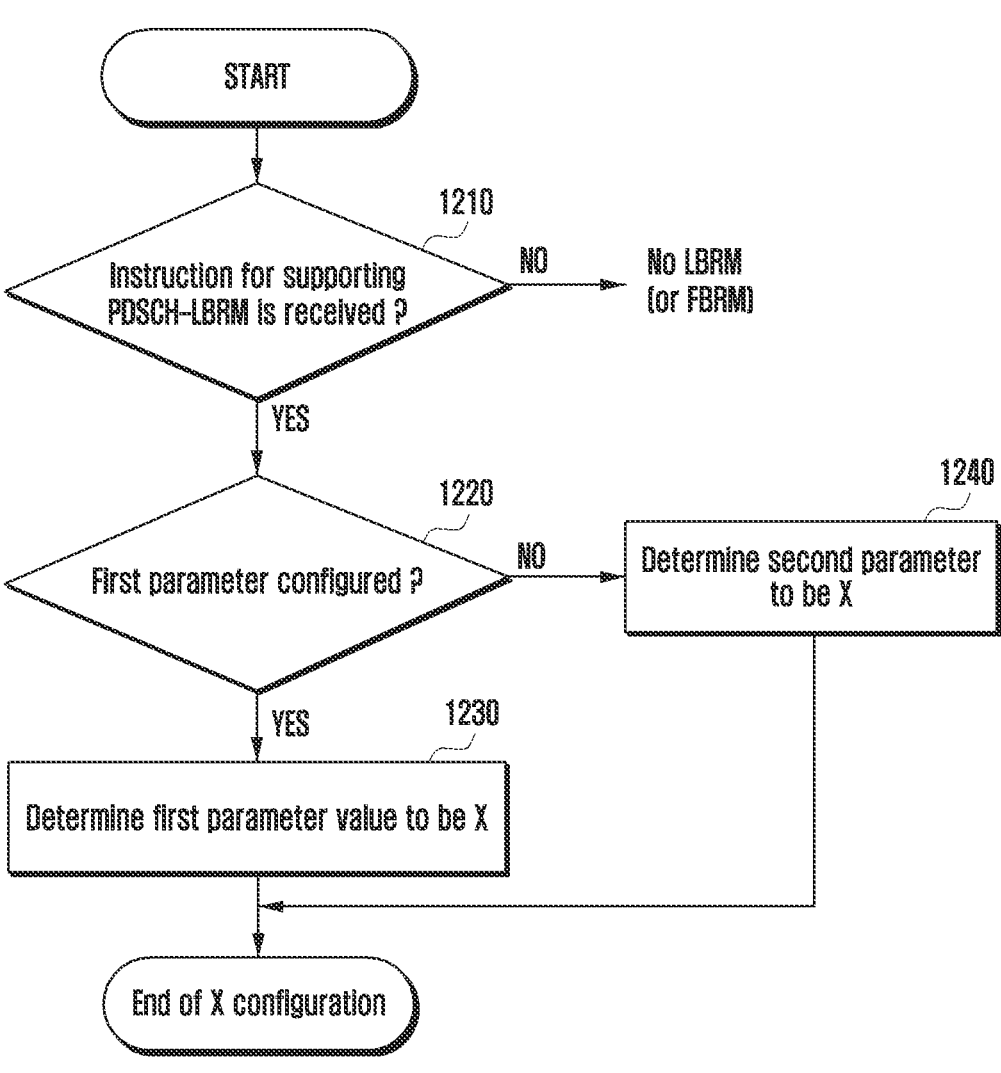
FIG. 12 is a flowchart illustrating a method of applying LBRM in performing groupcast or multicast/broadcast data transmission and reception according to an embodiment of the disclosure.

FIG. 12 is a flowchart illustrating a method of applying LBRM in performing groupcast or multicast/broadcast data transmission and reception according to an embodiment of the disclosure.

Referring to FIG. 12 as a specific example, whether an instruction for supporting PDSCH-LBRM is received is determined first at operation 1210. If an instruction for supporting PDSCH-LBRM is not received, LBRM is not applied. If an instruction for supporting PDSCH-LBRM is received, whether a first parameter needed first is configured is identified at operation 1220. For example, when a unicast service is being supported, the first parameter may be parameter maxMIMO-Layers included in higher layer signaling PDSCH-ServingCellConfig. When groupcast or multicast/broadcast is being supported, the first parameter may mean a different value. If the first parameter is configured, the first parameter or a value corresponding thereto may be determined to be, for example, an X value for determining the number of layers in Table 23 at operation 1230. If the first parameter is not configured, a second parameter may be identified, and the second parameter or a value corresponding thereto may be determined to be an X value at operation 1240. Here, the X value may mean a default value.

Here, in the case of unicast, the second parameter may be a parameter corresponding to the maximum number of layers for the PDSCH supported by the UE in the serving cell in higher layer signaling, and when groupcast or multicast/broadcast is being supported, the second parameter may mean a different value. In other words, the first parameter and the second parameter for performing PDSCH-LBRM may be equally applied to the case of unicast and the case where multicast/broadcast is supported, but at least one thereof may be determined to be a different parameter depending on the system.

In addition, if the first parameter and the second parameter have different values for different UEs, it may be ambiguous for the base station or the UE to specify the parameter value required for LBRM based on which value. In this case, different LBRM operations may be performed. Hence, the first parameter and the second parameter may be set to the same value only for UEs receiving the same groupcast or multicast/broadcast service. For example, the base station may determine a minimum value (e.g., first parameter) among possible maxMIMO-Layers values or a minimum value (e.g., second parameter) among possible maximum numbers of supportable layers, and may configure each parameter to have the same value for all UEs in the same group. Alternatively, regardless of this, the base station may configure each parameter to a preconfigured value. (In this case, it may be delivered to each UE through signaling or parameters different from existing higher layer signaling or parameters. e.g., maxMIMO-Layers_multicast) That is, when the first parameter or the second parameter is configured identically for UEs receiving groupcast or multicast/broadcast (or, when the first parameter or the second parameter is grouped for UEs), the UEs can easily determine the parameters required for LBRM.

Furthermore, a code rate parameter $R_{LBRM}$ required to identify or determine $TBS_{LBRM}$ for groupcast or multicast/broadcast may also be set to a value other than 2/3. In addition, a constraint different from the existing unicast constraint may be placed on at least one of parameters or variables required to identify or determine $TBS_{LBRM}$ in [TBS determination process 1]. As a specific example, the maximum code rate of 948/1024 considering LBRM may also be set to a different value (e.g., value smaller than 948/1024), and the value of 156 in equation $N_{RE}=156 \cdot n_{PRB}$ can also be set to another value (e.g., number that is a multiple of 12 and less than 156). This parameter configuration method is equally applicable not only to the present embodiment but also to the following embodiments without a specific mention.

LBRM for MBS data transmission described above may be determined, for example, as shown in Table 24 below.

TABLE 24 length $N_{cb}$ of a circular buffer and rate matching of the r-th code block is determined by $N_{cb} = \min(N, N_{ref})$, where N may be a value defined in Clause 5.3.2 of TS38.212, $N_{ref} = \left\lfloor \dfrac{TBS_{LBRM}}{C \cdot R_{LBRM}} \right\rfloor$, $R_{LBRM} = 2/3$.

$TBS_{LBRM}$ is determined by the method of determining TBS in Clause 5.1.3.2 of TS38.214, and the TBS value determined under the following assumptions may be called $TBS_{LBRM}$. Here, mbs-RNTI may be a value configured for MBS transmission, the CRC of the DCI scheduling the PDSCH for MBS may be scrambled using mbs-RNTI, and mbs-RNTI may be used for PDSCH transmission for MBS.

maximum number of layers used for a transport block (TB) for DL-SCH/PCH transmission using mbs-RNTI is determined by the minimum of X and 4, where if higher layer parameter (e.g., maxMIMO-Layers of mbsPDSCH-ServingCellConfig of the serving cell) used for mbsPDSCH transmission is configured, X is given by that parameter; otherwise X is given by 1.

if the mcs table for mcs PDSCH transmission set in the corresponding BWP supports 256QAM, $Q_m = 8$ is assumed; otherwise $Q_m = 6$ is assumed.

maximum coding rate is 948/1024.

$n_{PRB} = n_{PRB,LBRM}$ is given below by Table 5.4.2.1-x.

$N_{RE} = 156 \cdot n_{PRB}$

C is the number of code blocks included in the TB being transmitted.

37

TABLE 24-continued

Table 5.4.2.1-x: Value of $n_{PRB,LBRM}$

| Number of PRBs of the DL BWP for the MBS | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

As another example, LBRM for MBS data transmission described above may be determined as shown in Table 25 below. In this method, when determining the maximum number of layers X, X is determined by the configured value not by the smaller one of the configured value and 4 as shown in Table 24. This may be because MBS transmission does not support transmission with 4 or more layers.

TABLE 25 length $N_{cb}$ of a circular buffer and rate matching of the r-th code block is determined by $N_{cb} = \min(N, N_{ref})$, where N may be a value defined in Clause 5.3.2 of TS38.212, $N_{ref} = \left\lfloor \dfrac{TBS_{LBRM}}{C \cdot R_{LBRM}} \right\rfloor$, $R_{LBRM} = 2/3$.

$TBS_{LBRM}$ is determined by the method of determining TBS in Clause 5.1.3.2 of TS38.214, and the TBS value determined under the following assumptions may be called $TBS_{LBRM}$. Here, mbs-RNTI may be a value configured for MBS transmission, the CRC of the DCI scheduling the PDSCH for MBS may be scrambled using mbs-RNTI, and mbs-RNTI may be used for PDSCH transmission for MBS.
   maximum number of layers used for a transport block (TB) for DL-SCH/PCH transmission using mbs-RNTI is determined by X, where
   if higher layer parameter (e.g., maxMIMO-Layers of mbsPDSCH-ServingCellConfig of the serving cell) used for mbsPDSCH transmission is configured, X is given by that parameter; otherwise X is given by 1.
   if the mcs table for mcs PDSCH transmission set in the corresponding BWP supports 256QAM, $Q_m = 8$ is assumed; otherwise $Q_m = 6$ is assumed.
   maximum coding rate is 948/1024.
   $n_{PRB} = n_{PRB,LBRM}$ is given below by Table 5.4.2.1-x.
   $N_{RE} = 156 \cdot n_{PRB}$
C is the number of code blocks included in the TB being transmitted.

Table 5.4.2.1-x: Value of $n_{PRB,LBRM}$

| Number of PRBs of the DL BWP for the MBS | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the existing LBRM application, that is, in [existing rate matching configuration in consideration of PDSCH-LBRM], it is possible to determine whether to apply LBRM or full buffer rate matching (FBRM) according to the value of $I_{LBRM}$. In the disclosure, LBRM may be a method of performing rate matching using $N_{cb}=\min(N, N_{ref})$, and FBRM may be a method of performing rate matching using $N_{cb}=N$. When higher parameter or parameter $I_{LBRM}$ is 0, this may indicate FBRM, that is, $N_{cb}=N$; when $I_{LBRM}$ is 1, this may indicate LBRM, that is, $N_{cb}=\min(N, N_{ref})$.

It may be possible to restrict MBS transmission to a case where the TBS is not large. As MBS is to be transmitted to plural UEs, this restriction may also support a UE having low capability. Hence, LBRM and FBRM may be applied differently depending on the RNTI value. That is, when the DCI is detected with mbs-RNTI used for MBS data transmission and scheduling, $I_{LBRM}=0$ may be set (i.e., apply FBRM); when the DCI is detected with a different RNTI (or, otherwise), $I_{LBRM}=1$ may be set (i.e., apply LBRM).

It may be possible to set $I_{LBRM}$ in the BWP through which data transmission is performed.

As another example, it may also be possible to set $I_{LBRM}$ for each mbs-RNTI. For instance, mbs-RNTI-1 and mbs-RNTI-2 values may be set for MBS transmission, and $I_{LBRM}$ corresponding to each RNTI value may also be set. $I_{LBRM}=0$ may be set for the mbs-RNTI-1 value, and $I_{LBRM}=1$ may be set for the mbs-RNTI-2 value. Then, the base station and the UE may set $I_{LBRM}=0$ for MBS data scheduled and transmitted using mbs-RNTI-1 (i.e., FBRM is applied), and may set $I_{LBRM}=1$ for MBS data scheduled and transmitted using mbs-RNTI-2 (i.e., LBRM is applied). If there is no $I_{LBRM}$ Setting in the RNTI, it can be regarded as $I_{LBRM}=1$. In other words, if $I_{LBRM}=0$ is set in the RNTI setting, FBRM may be applied; otherwise, LBRM may be applied.

Second Embodiment

As another example of a parameter configuration method for applying LBRM to groupcast or multicast/broadcast, it is possible to utilize a value set in advance (default (or preset) value or integer, such as 1, 2, 3, 4).

For example, when an instruction for LBRM application to groupcast or multicast/broadcast is received, at least some parameters necessary for identifying or determining $TBS_{LBRM}$ may be set to a preconfigured value. Specifically, it is possible to set a specific integer such as X=1 or 2, or it is possible to promise to set a specific value, such as a value mandated to the UE as a specific integer or maximum number of layers in the frequency domain or band. That is, this predetermined or preconfigured value depends on the frequency domain or band. (Hereinafter, in this or subsequent embodiment, the description may be given assuming, but not limited to, that X=1. For example, an integer value such as X=2, 3 or 4 may be set. In addition, in the following embodiments, the configuration may be completed by omitting the process of setting X to a preset value without a separate mention.)

When an LBRM application instruction is received while a groupcast or multicast/broadcast service is being supported, at least some of the parameters necessary to identify or determine $TBS_{LBRM}$ may be immediately set to a preconfigured value without an additional operation, but may also be set in appropriate combination with operations of other embodiments.

As a specific example, a method combined with the first embodiment will be described with reference to FIGS. 13 and 14.

Figure 13:
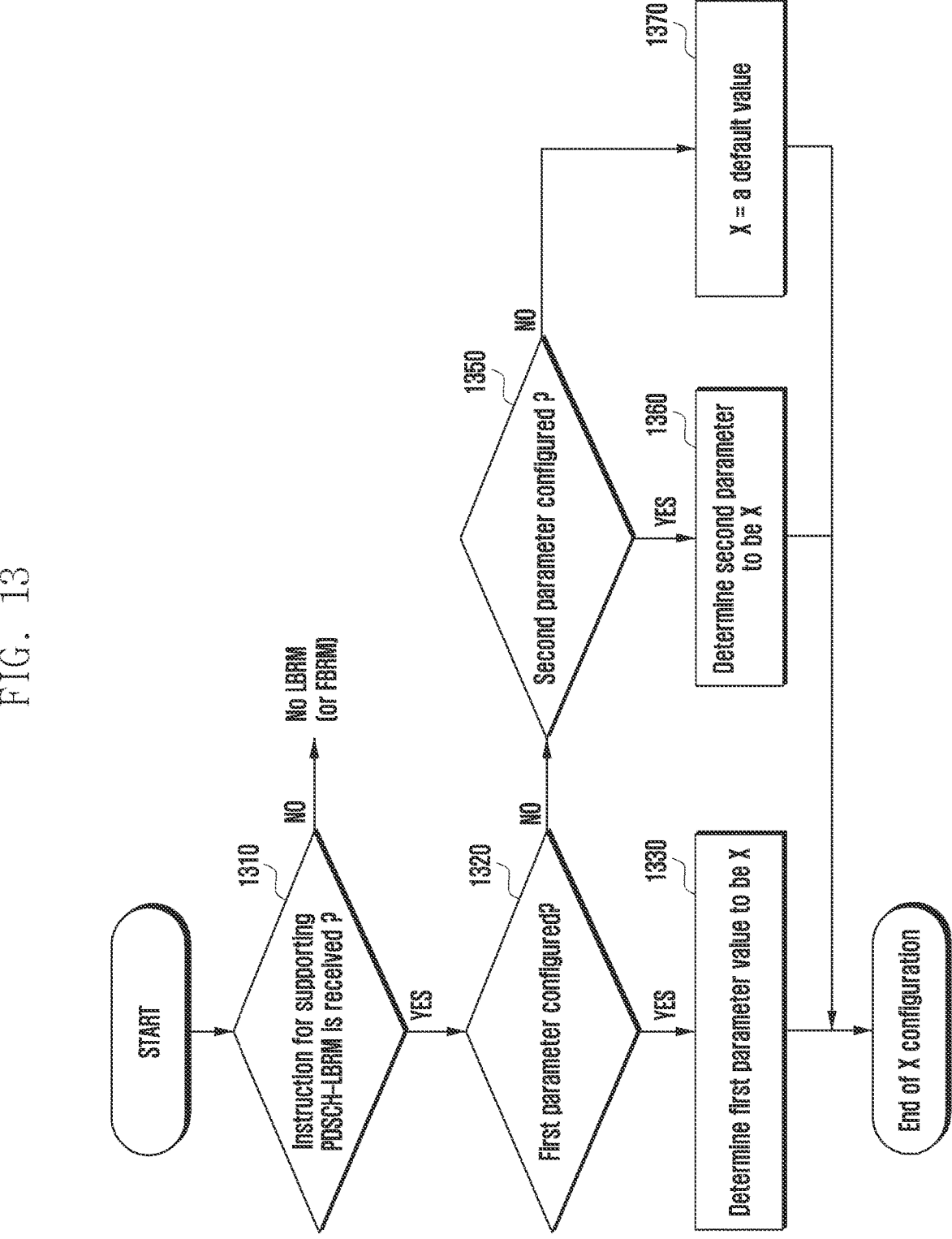
FIG. 13 is another flowchart illustrating a method of applying LBRM in performing groupcast or multicast/broadcast data transmission and reception according to an embodiment of the disclosure.
Figure 14:
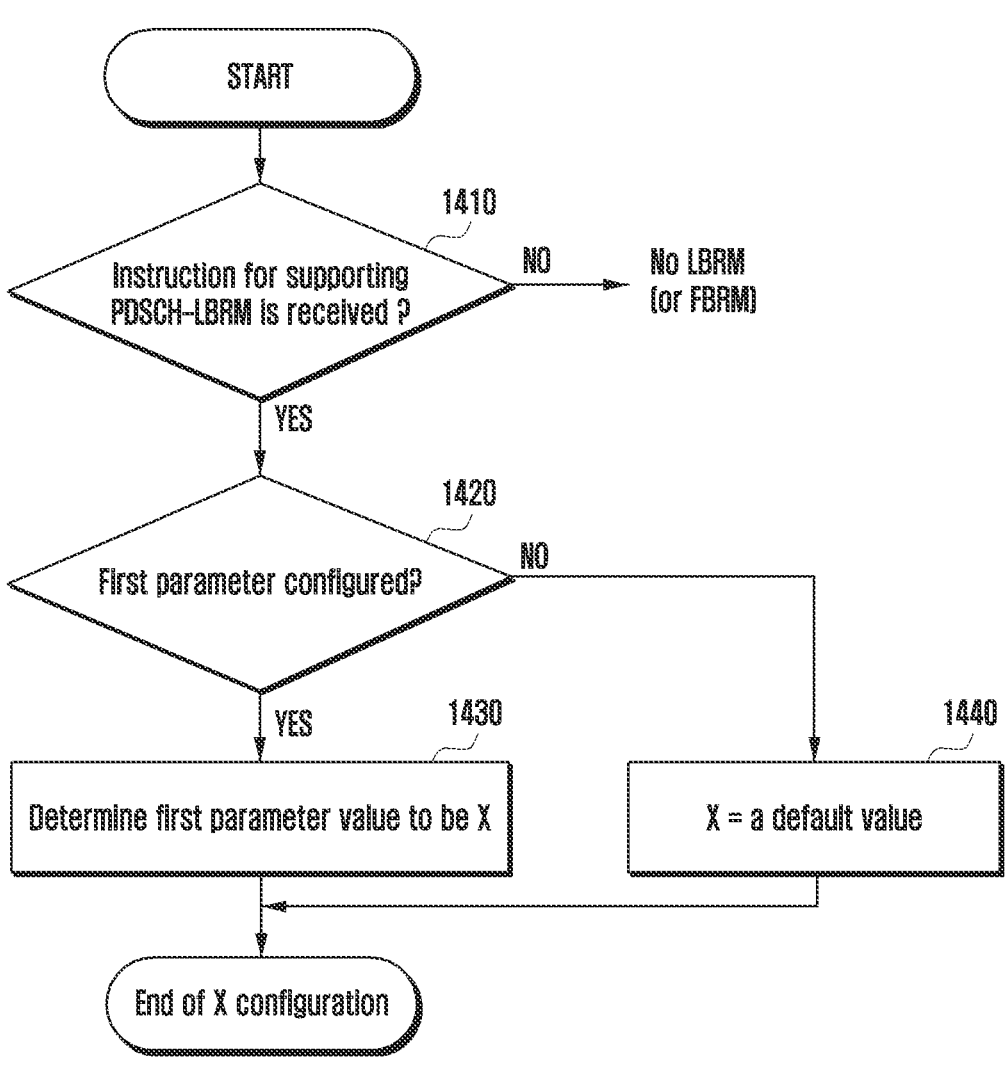
FIG. 14 is another flowchart illustrating a method of applying LBRM in performing groupcast or multicast/broadcast data transmission and reception according to an embodiment of the disclosure.

FIGS. 13 and 14 are flowcharts illustrating a method of applying LBRM in performing groupcast or multicast/broadcast data transmission and reception according to various embodiments of the disclosure.

Referring to FIG. 13, whether an instruction for supporting PDSCH-LBRM is received is determined first at operation 1310. If an instruction for supporting PDSCH-LBRM is not received, LBRM is not applied. If an instruction for supporting PDSCH-LBRM is received, whether a first parameter needed first is configured is identified at operation 1320. If the first parameter is configured, the first parameter or a value corresponding thereto may be determined to be, for example, an X value for determining the number of layers in Tables 23 to 25 at operation 1330. If the first parameter is not configured, a second parameter may be identified at operation 1350, and the second parameter or a value corresponding thereto may be determined to be an X value at operation 1360. If the second parameter is not set either, the value of X may be set to a preconfigured value at operation 1370. This value may vary depending on the frequency domain or band.

Referring to FIG. 14, when it is difficult to equally set the second parameter or the maximum number of layers for the PDSCH supported by the UE in the serving cell for the UEs in the same group (or, when it is difficult to group UEs with the same maximum number of layers), if the first parameter is not set as in FIG. 14, at least some of the parameter values required for LBRM may be set to a preconfigured value at operation 1440 regardless of the second parameter or the maximum number of layers for the PDSCH supported by the UE in the serving cell. For operations 1410 to 1430, refer to operations 1310 to 1330 of FIG. 13. In addition, when the first parameter cannot be equally set for individual UEs, the X value may be determined to be a preconfigured value regardless of the first parameter or the second parameter.

The preconfigured value may mean one integer value fixed in the system, but may also be an integer value that can be identified or determined through another higher layer parameter. For example, in the case of broadcast (or group/multicast), the X value may be determined based on a higher layer signaling or parameter value included in at least one of the master information block (MIB) or the system information block (SIB) or a value corresponding thereto.

Third Embodiment

As another example of the parameter configuration method for applying LBRM to groupcast or multicast/broadcast, a method for setting a maximum modulation order parameter may be necessary.

The base station may configure the UE with frequency resources (PRBs) or BWPs for MBS data transmission. In addition, the base station may configure a resource for transmitting the DCI (or PDCCH) for scheduling MBS data transmission, which may be in the form of a CORESET, that is, a CORESET for MBS. That is, the base station may configure frequency and time resources of a CORESET for MBS to the UE or UEs. Here, the CORESET configuration for MBS may include a slot index, a symbol index (or a start symbol and length), and a setting related to frequency PRBs.

For example, it is possible to determine the modulation order by using different mcs-Table configuration values according to the RNTI. In addition, currently in the case of unicast, if a mcs-Table is set in a parameter (e.g., qam256) corresponding to 256QAM for at least one DL BWP, the modulation order Qm is set to 8; otherwise, the modulation order is set to 6. However, when UEs receiving groupcast or multicast/broadcast do not have the same mcs-Table configuration, it may be ambiguous to specify the modulation order value for LBRM. Hence, when the same mcs-Table is set for the UEs receiving the same groupcast or multicast/broadcast (or, when UEs with the same mcs-Table configuration are grouped), it is easy to specify a modulation order value for LBRM. (In this case, it may be delivered to each UE through signaling or a parameter different from the existing higher layer signaling or a parameter. Example: mcs-Table_multicast).

In addition, currently, the modulation order for LBRM in unicast is set to a maximum value of 8 or a minimum value of 6 according to the setting value of parameter mcs-Table, but it may be set to different values in the case of groupcast or multicast/broadcast. For example, in the case of supporting a groupcast or multicast/broadcast service, if the mcs-Table multicast value is fixed to a value corresponding to 64QAM as a maximum modulation scheme, the case where the modulation order is 8 as an LBRM parameter may be excluded, that is, the modulation order $(Q_m)$ as an LBRM parameter may be determined to be 6. Furthermore, in the case of supporting a groupcast or multicast/broadcast service, if the maximum modulation order is limited to a specific value regardless of the mcs-Table_multicast value, the modulation order as an LBRM parameter may be determined to be the corresponding specific modulation order. For example, when the groupcast or multicast/broadcast service always operates at 64QAM or less, it may be set to 6; when operating at 16QAM or less, it may be set to 6; and when operating at QPSK or less, it may be set to 2.

As described above, to apply LBRM in multicast/broadcast data transmission, $TBS_{LBRM}$ may be determined based on the RNTI, or a parameter needed to determine $TBS_{LBRM}$ may be determined. The base station may configure the UE with a separate RNTI value for multicast/broadcast data transmission. In the disclosure, the RNTI for multicast/broadcast may be referred to as MBS-RNTI. That is, when the DCI is normally received upon receiving the DCI, if the RNTI value used for decoding (e.g., RNTI value used for descrambling) is an MBS-RNTI, the UE may use the modulation order set for multicast/broadcast transmission. Alternatively, when groupcast or multicast/broadcast is being supported, a parameter configuration method different from that for unicast may be applied based on the RNTI. This may be an example of determining a parameter using the RNTI when a plurality of RNTIs are configured for MBS.

Fourth Embodiment

According to [existing rate matching configuration in consideration of PDSCH-LBRM] of Table 23, the $n_{PRB}$ value is determined first according to a predefined rule based on the $n_{PRB,LBRM}$ value, and the size of the allocated resource element such as $N_{RE}=156 \cdot n_{PRB}$ is determined. Here, when a groupcast or multicast/broadcast service is supported, the method of determining the $n_{PRB}$ value may vary.

For example, in the case of supporting a multicast/broadcast service, this value may be determined as the number of PRBs configured for MBS or may be determined based on a corresponding value. That is, the configured number of PRBs may be commonly applied to UEs belonging to the same group. This value may be the size of the BWP or a value corresponding thereto.

As another example, based on the PRBs configured for MBS transmission or the number of PRBs of the BWP configured for MBS transmission, $n_{PRB,LBRM}$ may be calculated as in Table 26 below. That is, for example, if the PRB of the BWP configured for MBS transmission is set to 100 PRBs, $n_{PRB,LBRM}=107$ may be $n_{PRB}$ used for determining $TBS_{LBRM}$.

TABLE 26

| Number of PRBs of DL BWP of a carrier for DL-SCH with MBS-RNTI | $n_{PRB, LBRM}$ |
| --- | --- |
| Less than 33 | 32 |
| 33 to 66 | 66 |

TABLE 26-continued

| Number of PRBs of DL BWP of a carrier for DL-SCH with MBS-RNTI | $n_{PRB, LBRM}$ |
|---|---|
| 67 to 107 | 107 |
| 108 to 135 | 135 |
| 136 to 162 | 162 |
| 163 to 217 | 217 |
| Larger than 217 | 273 |

Fifth Embodiment

The fifth embodiment of the disclosure provides a method of selecting rate matching configuration. Various embodiments of the disclosure provide a method of applying LBRM in multicast/broadcast data transmission, which may be referred to as [LBRM application to multicast/broadcast], and this may be different from [existing rate matching configuration in consideration of PDSCH-LBRM] in the existing NR system.

Figure 15:
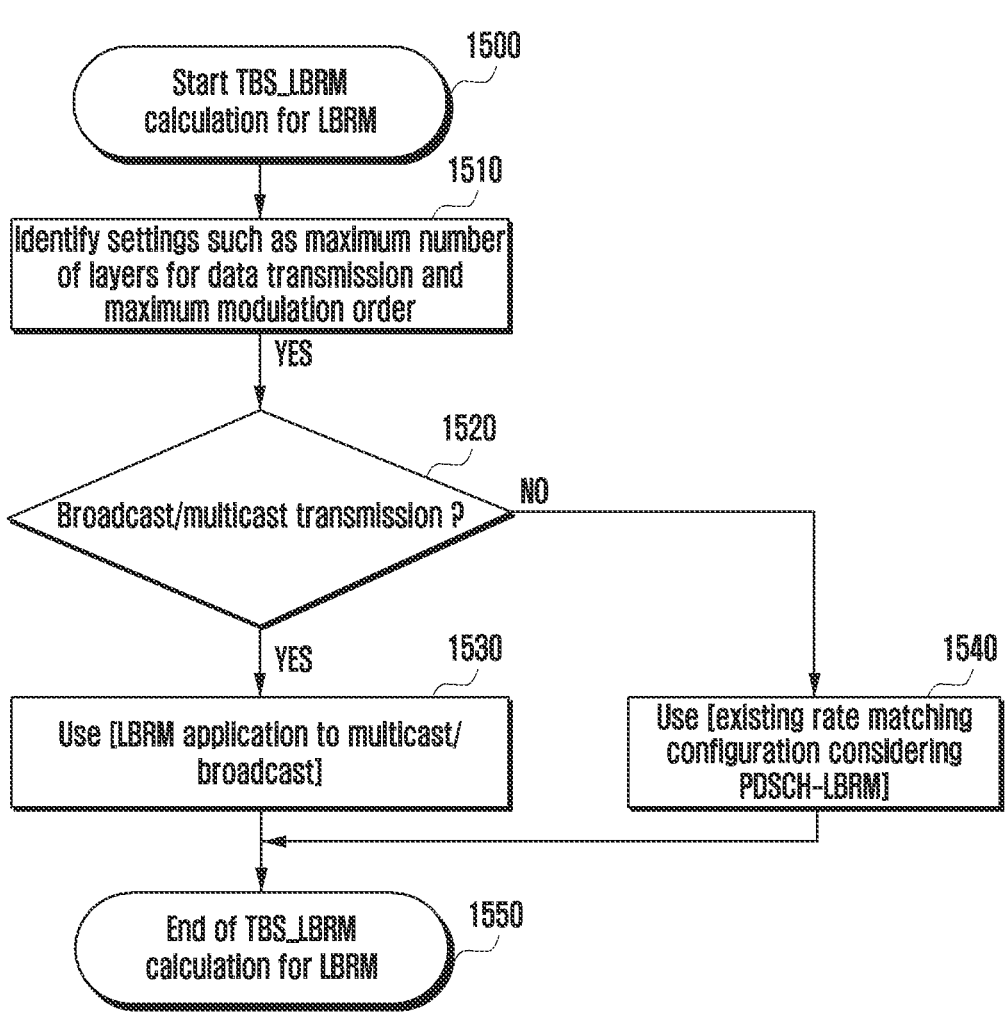
FIG. 15 is a flowchart illustrating a method for a UE to identify broadcast/multicast transmission and to apply LBRM differently correspondingly according to an embodiment of the disclosure.

FIG. 15 is a flowchart illustrating a method in which a UE determines whether broadcast/multicast (MBS) is transmitted when receiving control information or data and applies LBRM differently correspondingly according to an embodiment of the disclosure.

Referring to FIG. 15, to perform TBS_LBRM calculation for LBRM at operation 1500, parameter settings such as maximum number of layers for data transmission and maximum modulation order may be identified first at operation 1510, and whether there is broadcast/multicast (MBS) transmission may be determined at operation 1520. In case of broadcast/multicast, parameters suitable for this may be determined (based on [LBRM application to multicast/broadcast]) at operation 1530. In case of unicast, parameters according to the existing method may be determined (based on [existing rate matching configuration in consideration of PDSCH-LBRM]) at operation 1540. Here, operation 1510 may be skipped. TBS_LBRM calculation for LBRM may be performed by using the determined parameters at operation 1550, and data reception may be performed by applying LBRM.

Here, the following methods may be used to determine whether there is broadcast/multicast at operation 1520.

Method 1: it is determined based on the RNTI value scrambled with control information (DCI) that schedules data. That is, in case of MBS transmission, LBRM is performed using [LBRM application to multicast/broadcast]; in case of not MBS transmission, LBRM is performed using [existing rate matching configuration in consideration of PDSCH-LBRM]. In the disclosure, performing LBRM may mean to the base station that it performs rate matching in consideration of LBRM to map and transmit data (PDSCH), and may mean to the UE that it decodes the PDSCH according to rate matching in consideration of LBRM. The base station may configure an MBS-RNTI value to a UE or UEs to enable MBS reception. Hence, the DCI scrambled with an MBS-RNTI may be determined as scheduling MBS transmission, and the corresponding PDSCH may be determined as being for MBS; utilizing an RNTI value such as C-RNTI, MCS-C-RNTI, TC-RNTI, CS-RNTI, SI-RNTI, RA-RNTI, MsgB-RNTI, or P-RNTI may be interpreted as not being MBS transmission. The base station may configure the UE with one or plural MBS-RNTIs, where individual MBS-RNTIs may be used for different purposes and for data transmitted over different resources. The term MBS-RNTI is only an example of an RNTI used for multicast/broadcast, and may be referred to by various names.

Method 2: determination may be made based on the DCI format. For example, the base station may configure DCI format 2-x for MBS transmission, and the corresponding configuration may be set in a certain CORESET. Hence, when DCI format 2-x is detected in the above CORESET, the UE may determine that the PDSCH scheduled by DCI format 2-x is for MBS.

Method 3: determination may be made based on the CORESET where the DCI (or PDCCH) scheduling data is transmitted.

Method 4: in case of configured grant transmission (or, semi-persistent scheduling (SPS) transmission), determination may be made according to the settings of the PDSCH transmitted corresponding thereto.

Method 5: determination may be made based on the configured HARQ process number. That is, the base station may configure in advance a HARQ process number for MBS to the UE. Thereafter, when scheduling is received with the corresponding HARQ process number, the UE may determine that the corresponding transmission is for MBS.

In the parameter configuration and determination methods in consideration of LBRM proposed in various embodiments of the disclosure, decoding is possible only when the base station and the UE or the transmitter and the receiver maintain the same or agreed settings. In addition, it is possible to derive a new configuration and determination method by combining the parameter configuration and determination methods mentioned in the embodiments presented by the disclosure in various ways.

Figure 16:
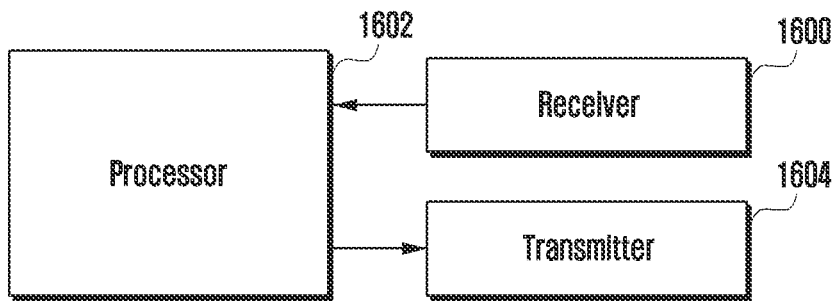
FIG. 16 is a block diagram illustrating a structure of a UE according to an embodiment of the disclosure.
Figure 17:
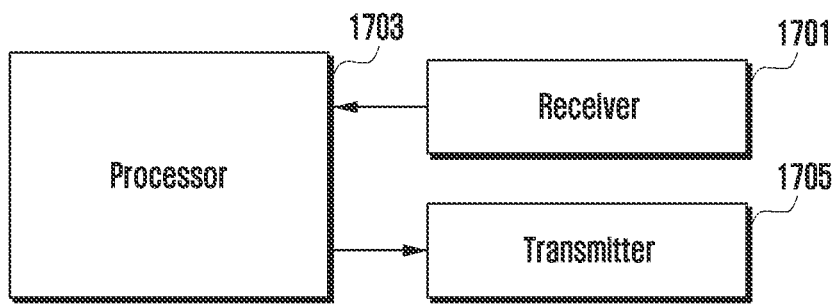
FIG. 17 is a block diagram illustrating a structure of a base station according to an embodiment of the disclosure.

To carry out the above embodiments of the disclosure, a UE and a base station each including a transmitter, a receiver, and a processor are shown in FIGS. 16 and 17, respectively. The method for the UE or base station to transmit and receive groupcast and unicast control information and data is described in the above embodiments, and the receiver, processor, and transmitter of the base station and the UE must each operate according to the embodiments for carrying out the method. When this embodiment is applied to data transmission and reception in the sidelink, the base station in the following operations may be a UE performing transmission in the sidelink or a related-art base station. In the following operations, the UE may be a UE performing transmission or reception in the sidelink.

FIG. 16 is a block diagram illustrating a structure of a UE according to an embodiment of the disclosure.

Referring to FIG. 16, a UE of the disclosure may include a receiver 1600, a transmitter 1604, and at least one processor 1602. The receiver 1600 and the transmitter 1604 may be collectively referred to as a transceiver in the embodiment of the disclosure. The transceiver may transmit and receive a signal to and from a base station. The signal may include control information and data. To this end, the transceiver may include an RF transmitter for up-converting and amplifying the frequency of a signal to be transmitted, and an RF receiver for low-noise amplifying a received signal and down-converting the frequency thereof. In addition, the transceiver may receive a signal through a radio channel and output it to the processor 1602, and may transmit a signal output from the processor 1602 through a radio channel. The processor 1602 may include a controller for controlling a series of processes so that the UE can operate according to the above-described embodiments of the disclosure.

The controller that controls the operation of the UE according to various embodiments of the disclosure described above may perform the following operations.

In a communication system or broadcasting system, a user equipment (UE) (or, terminal) may receive a signal corresponding to data transmitted from a transmitter equipment or base station and appropriately perform decoding based on a channel coding scheme through a suitable demodulation process. To perform decoding, the UE must determine exactly the same rate matching method used by the transmitter equipment or base station. Hence, the UE may identify whether LBRM is applied based on an instruction for LBRM. Here, as parameter settings for LBRM operation may vary depending on whether unicast (or, data transmission to one UE) or multicast/groupcast (or, data transmission to plural UEs) is used, an operation for identifying whether unicast transmission or multicast/groupcast transmission is used may be added. Also, the UE may determine or identify whether unicast or multicast/groupcast is used based on a higher layer signaling or indicator separately transmitted from the base station. When it is necessary to perform an operation corresponding to LBRM performed by the transmitter equipment in a unicast (or data transmission to one UE) situation, the UE may perform an operation corresponding to LBRM performed by the transmitter equipment based on a first configuration; when it is necessary to perform an operation corresponding to LBRM performed by the transmitter equipment in a multicast/groupcast (or data transmission to plural UEs) situation, the UE may perform an operation corresponding to LBRM performed by the transmitter equipment based on a second configuration. Here, at least one of the parameters corresponding to the first configuration may be different from the parameters corresponding to the second configuration, or at least one of the values of the parameters corresponding to the first configuration may be different from the values of the parameters corresponding to the second configuration. A specific scheme for the first configuration and the second configuration may be determined based on the first to fifth embodiments or appropriate combinations of operations thereof.

For reference, the operation performed by the receiver equipment (e.g., UE) in accordance with LBRM of the transmitter equipment (e.g., base station) may also be referred to as an LBRM operation for convenience. In other words, the LBRM operation in the receiver equipment means an operation corresponding to LBRM of the transmitter equipment. In addition, although the LBRM operation performed in the base station is an operation performed at a bit level, the operation performed by the receiver equipment in accordance with LBRM performed by the transmitter equipment may be performed in accordance with values corresponding to a received signal generated or determined based on demodulation. For example, if likelihood ratio (LR) or log-likelihood ratio (LLR) values corresponding to transmitted bits are determined based on a received signal through demodulation, the LBRM operation of the receiver equipment may be performed based on the LR or LLR values for the bits or other message values corresponding thereto. Hence, after LBRM is performed in the receiver equipment as described above, the transmitted data may be determined or restored by performing decoding of channel coding based on values (e.g., LR or LLR) corresponding to a bit sequence transmitted from the transmitter equipment that can be determined or identified based on LBRM.

FIG. 17 is a block diagram illustrating a structure of a base station according to an embodiment of the disclosure.

Referring to FIG. 17, a base station of the disclosure may include a receiver 1701, a transmitter 1705, and at least one processor 1703. The receiver 1701 and the transmitter 1705 may be collectively referred to as a transceiver in the embodiment of the disclosure. The transceiver may transmit and receive a signal to and from a UE. The signal may include control information and data. To this end, the transceiver may include an RF transmitter for up-converting and amplifying the frequency of a signal to be transmitted, and an RF receiver for low-noise amplifying a received signal and down-converting the frequency thereof. In addition, the transceiver may receive a signal through a radio channel and output it to the processor 1703, and may transmit a signal output from the processor 1703 through a radio channel. The processor 1703 may include a controller for controlling a series of processes so that the base station can operate according to the above-described embodiments of the disclosure.

The controller that controls the operation of the base station according to various embodiments of the disclosure described above may perform the following operations.

In a communication system or broadcasting system, the base station may first appropriately encode data to be transmitted based on a channel coding scheme. Then, the base station may determine whether to perform LBRM on the encoded data. Here, as parameter settings for LBRM operation may vary depending on whether unicast (or, data transmission to one UE) or multicast/groupcast (or, data transmission to plural UEs) is used, an operation for checking whether unicast transmission or multicast/groupcast transmission is used may be added. Also, the base station may indicate to the UE whether unicast or multicast/groupcast is used through a separate higher layer signaling or indicator. When it is necessary to perform LBRM in a unicast (or data transmission to one UE) situation, the base station may perform LBRM based on a first configuration; when it is necessary to perform LBRM in a multicast/groupcast (or data transmission to plural UEs) situation, the base station may perform LBRM based on a second configuration. Here, at least one of the parameters corresponding to the first configuration may be different from the parameters corresponding to the second configuration, or at least one of the values of the parameters corresponding to the first configuration may be different from the values of the parameters corresponding to the second configuration. A specific scheme for the first configuration and the second configuration may be determined based on the first to fifth embodiments or appropriate combinations of operations thereof. After LBRM is performed as described above, the base station may apply appropriate modulation to a bit sequence that can be determined or identified based on the LBRM and transmit it to the UE (or, terminal).

On the other hand, the embodiments of the disclosure disclosed in the specification and drawings are provided as specific examples in order to easily explain the subject matter of the disclosure and help the understanding of the disclosure, and are not intended to limit the scope of the disclosure. That is, it will be apparent to those of ordinary skill in the art to which the disclosure pertains that other modifications based on the technical contents of the disclosure can be carried out. In addition, the above embodiments may be operated in combination with each other as needed. For example, the first embodiment and the second embodiment may be applied in combination. Further, other modified embodiments may be carried out based on the technical contents of the above embodiments in relation to LTE and 5G systems.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method performed by a base station in a wireless communication system, the method comprising:

transmitting, to a user equipment (UE), configuration information associated with a physical downlink shared channel (PDSCH) for multicast, wherein, as a response to a parameter indicating a maximum number of layers being configured in the configuration information, the maximum number of layers equals a value given by the parameter, and wherein, as a response to the parameter not being configured in the configuration information, the maximum number of layers equals 1;

determining a transport block size (TBS) associated with limited buffer rate matching (LBRM) based on the maximum number of layers;

performing rate matching based on the TBS associated with the LBRM; and transmitting the PDSCH for multicast after performing rate matching.

2. The method of claim 1, wherein the configuration information further includes information associated with a modulation and coding scheme (MCS) table.

3. The method of claim 2, wherein the TBS associated with the LBRM is determined further based on a maximum modulation order, wherein in case that the information associated with the MCS table included in the configuration information corresponds to 64 quadrature amplitude modulation (QAM), the maximum modulation order equals 6, and wherein in case that the information associated with the MCS table corresponds to 256 QAM, the maximum modulation order equals 8.

4. The method of claim 1, further comprising:

transmitting, to the UE, downlink control information (DCI) for scheduling the PDSCH for multicast, wherein a cyclic redundancy check (CRC) of the DCI is scrambled by a radio network temporary identifier (RNTI) associated with multicast.

5. The method of claim 1, further comprising:

transmitting, to the UE, configuration information on a frequency resource for multicast, the frequency resource for multicast comprising a plurality of physical resource blocks (PRBs) for multicast, wherein the TBS associated with LBRM is determined further based on a number of PRBs associated with LBRM, and wherein the number of PRBs associated with LBRM is determined based on a size of the frequency resource for multicast.

6. A method performed by a user equipment (UE) in a wireless communication system, the method comprising:

receiving, from a base station, configuration information associated with a physical downlink shared channel (PDSCH) for multicast, wherein, as a response to a parameter indicating a maximum number of layers being configured in the configuration information, the maximum number of layers equals a value given by the parameter, and wherein, as a response to the parameter not being configured in the configuration information, the maximum number of layers equals 1; and receiving, from the base station, the PDSCH for multicast, wherein a bit sequence included in the PDSCH for multicast is rate matched based on a transport block size (TBS) associated with limited buffer rate matching (LBRM), and wherein the TBS associated with LBRM is determined based on the maximum number of layers.

7. The method of claim 6, wherein the configuration information further includes information associated with a modulation and coding scheme (MCS) table.

8. The method of claim 7, wherein the TBS associated with the LBRM is determined further based on a maximum modulation order, wherein in case that the information associated with the MCS table included in the configuration information corresponds to 64 quadrature amplitude modulation (QAM), the maximum modulation order equals 6, and wherein in case that the information associated with the MCS table corresponds to 256 QAM, the maximum modulation order equals 8.

9. The method of claim 6, further comprising:

receiving, from the base station, downlink control information (DCI) for scheduling the PDSCH for multicast, wherein a cyclic redundancy check (CRC) of the DCI is scrambled by a radio network temporary identifier (RNTI) associated with multicast.

10. The method of claim 6, further comprising:

receiving, from the base station, configuration information on a frequency resource for multicast, the frequency resource for multicast comprising a plurality of physical resource blocks (PRBs) for multicast, wherein the TBS associated with LBRM is determined further based on a number of PRBs associated with LBRM, and wherein the number of PRBs associated with LBRM is determined based on a size of the frequency resource for multicast.

11. A base station in a wireless communication system, the base station comprising:

at least one transceiver; and at least one processor configured to:

transmit, to a user equipment (UE), configuration information associated with a physical downlink shared channel (PDSCH) for multicast, wherein, as a response to a parameter indicating a maximum number of layers being configured in the configuration information, the maximum number of layers equals a value given by the parameter, and wherein, as a response to the parameter not being configured in the configuration information, the maximum number of layers equals 1, determine a transport block size (TBS) associated with limited buffer rate matching (LBRM) based on the maximum number of layers, perform rate matching based on the TBS associated with the LBRM, and transmit the PDSCH for multicast after performing rate matching.

12. The base station of claim 11, wherein the configuration information further includes information associated with a modulation and coding scheme (MCS) table.

13. The base station of claim 12,
wherein the TBS associated with the LBRM is determined further based on a maximum modulation order,
wherein in case that the information associated with the MCS table included in the configuration information corresponds to 64 quadrature amplitude modulation (QAM), the maximum modulation order equals 6, and
wherein in case that the information associated with the MCS table corresponds to 256 QAM, the maximum modulation order equals 8.

14. The base station of claim 11,
wherein the at least one processor is further configured to transmit downlink control information (DCI) for scheduling the PDSCH for multicast, and
wherein a cyclic redundancy check (CRC) of the DCI is scrambled by a radio network temporary identifier (RNTI) associated with multicast.

15. The base station of claim 11,
wherein the at least one processor is further configured to transmit, to the UE, configuration information on a frequency resource for multicast, the frequency resource for multicast comprising a plurality of physical resource blocks (PRBs) for multicast,
wherein the TBS associated with LBRM is determined further based on a number of PRBs associated with LBRM, and
wherein the number of PRBs associated with LBRM is determined based on a size of the frequency resource for multicast.

16. A user equipment (UE) in a wireless communication system, the UE comprising:
at least one transceiver; and
at least one processor configured to:
receive, from a base station, configuration information associated with a physical downlink shared channel (PDSCH) for multicast, wherein, as a response to a parameter indicating a maximum number of layers being configured in the configuration information, the maximum number of layers equals a value given by the parameter, and wherein, as a response to the parameter not being configured in the configuration information, the maximum number of layers equals 1, and receive, from the base station, the PDSCH for multicast,
wherein a bit sequence included in the PDSCH for multicast is rate matched based on a transport block size (TBS) associated with limited buffer rate matching (LBRM), and
wherein the TBS associated with LBRM is determined based on the maximum number of layers.

17. The UE of claim 16,
wherein the configuration information further includes information associated with a modulation and coding scheme (MCS) table.

18. The UE of claim 17,
wherein the TBS associated with the LBRM is determined further based on a maximum modulation order,
wherein in case that the information associated with the MCS table included in the configuration information corresponds to 64 quadrature amplitude modulation (QAM), the maximum modulation order equals 6, and
wherein in case that the information associated with the MCS table corresponds to 256 QAM, the maximum modulation order equals 8.

19. The UE of claim 16,
wherein the at least one processor is further configured to receive downlink control information (DCI) for scheduling the PDSCH for multicast, and
wherein a cyclic redundancy check (CRC) of the DCI is scrambled by a radio network temporary identifier (RNTI) associated with multicast.

20. The UE of claim 16,
wherein the at least one processor is further configured to receive, from the base station, configuration information on a frequency resource for multicast, the frequency resource for multicast comprising a plurality of physical resource blocks (PRBs) for multicast,
wherein the TBS associated with LBRM is determined further based on a number of PRBs associated with LBRM, and
wherein the number of PRBs associated with LBRM is determined based on a size of the frequency resource for multicast.

* * * * *